United States Patent [19]

Hattori et al.

[11] Patent Number: 5,257,100
[45] Date of Patent: Oct. 26, 1993

[54] APPARATUS FOR REDUCING NETWORK PATTERNS FROM THE IMAGE OF A FIBER SCOPE

[75] Inventors: Shinichiro Hattori, Akishima; Yuji Ikuno, Ome, both of Japan

[73] Assignee: Olympus Optical Co., Ltd., Tokyo, Japan

[21] Appl. No.: 765,081

[22] Filed: Sep. 24, 1991

[30] Foreign Application Priority Data

Sep. 28, 1990 [JP] Japan .................................. 2-259219

[51] Int. Cl.$^5$ .......................... H04N 7/18; A61B 1/04
[52] U.S. Cl. ............................................. 358/98; 128/6
[58] Field of Search .......................... 358/98; 128/4, 6; 385/117

[56] References Cited

U.S. PATENT DOCUMENTS 4,480,636 11/1984 Karaki et al. .......................... 358/98
4,618,884 10/1986 Nagasaki ............................... 358/98
4,905,668 3/1990 Ohsawa ................................. 358/98

Primary Examiner—James J. Groody
Assistant Examiner—Glenton B. Burgess

[57] ABSTRACT

An optical image is formed on one end surface of an image guide formed Of a fiber bundle by an objective optical system provided in a tip section at the tip of an elongate insertable section, is transmitted to the other end surface and is photoelectrically converted by an imaging device together with the pattern of the fiber bundle on the other end surface to be an image signal. This image signal is separated by a region separating circuit into a fiber bundle light transmitting region and another non-representative region. The image data of the non-representative region are processed to be replaced with other image data by an image replacing circuit to produce an image having had the network pattern of the fiber bundle reduced.

22 Claims, 22 Drawing Sheets

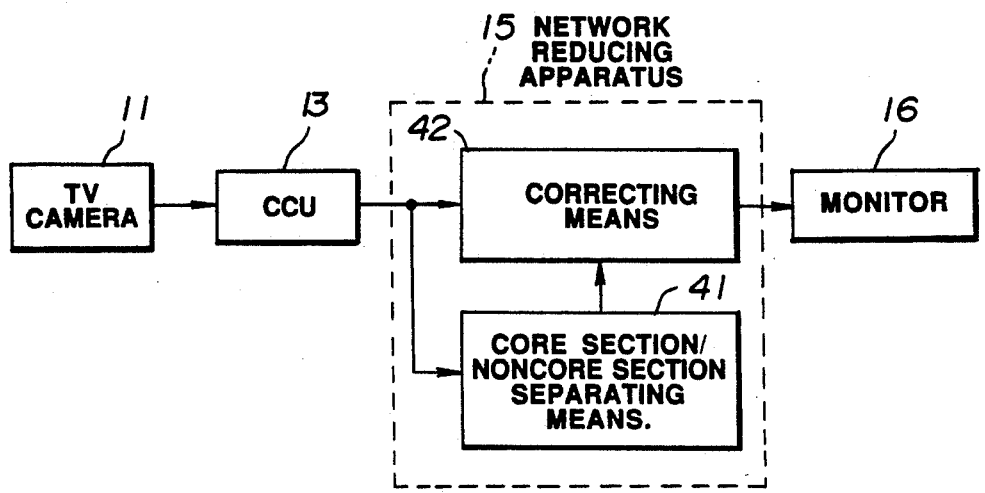
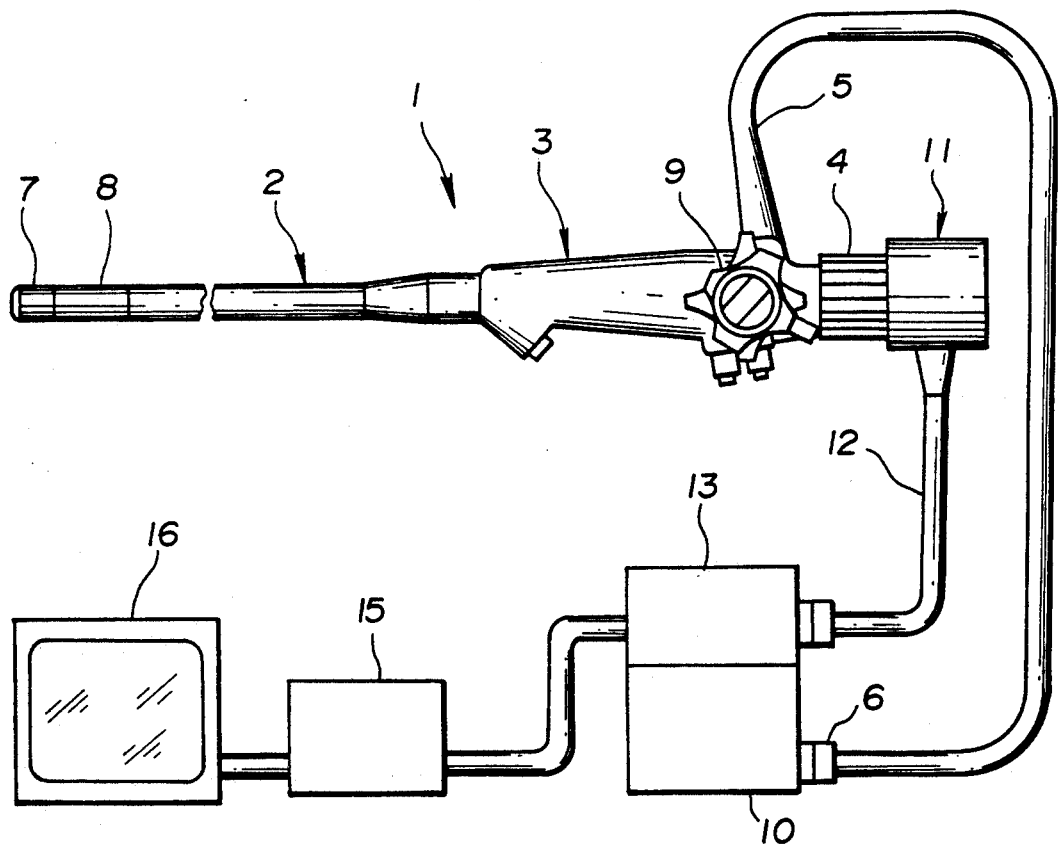

APPARATUS FOR REDUCING NETWORK PATTERNS FROM THE IMAGE OF A FIBER SCOPE

BACKGROUND OF THE INVENTION

1. Field of the Invention

This invention relates to a network pattern reducing apparatus for reducing network patterns caused by a fiber bundle in an endoscope image transmitted by an image guide made of the above mentioned fiber bundle.

2. Description of the Related Art

Recently, there has been extensively utilized an endoscope whereby organs within a body cavity can be observed by inserting an elongate insertable section into the body cavity or, as required, various therapeutic treatments can be made by using a treating instrument inserted through a treating instrument channel. In the above mentioned endoscope, there is a fiber scope wherein an object image formed by an objective lens in the tip part of the insertable section is transmitted to an eyepiece section by an image guide made of a fiber bundle so as to be observable with a naked eye. Also, with a television camera connected to the eyepiece section of the above mentioned fiber scope, the above mentioned object image is imaged so as to be able to be displayed in a monitor.

The fiber bundle forming the above mentioned image guide is made by closely bundling several tens of thousands of fine optical fibers forming respective pixels. The above mentioned optical fiber consists of a center core and a clad on its outer periphery. A fiber bundle made by bundling such optical fibers consists of sections transmitting the optical information of the object through the above mentioned cores and sections consisting of clearances between the above mentioned clads and respective optical fibers, and not transmitting the optical information of the object.

Therefore, network patterns by the sections not transmitting the above mentioned optical information will appear in the image transmitted by the image guide made of this fiber bundle. There is a problem that such network patterns not only will contribute nothing to the information of the object but also will make the object image hard to see. Therefore, it is desirable to provide an optical low pass filter between the image guide and the imaging means to remove the network pattern components. However, there is a problem that, in such case, the resolution will be reduced by the optical low pass filter and, as a result, the picture quality will be deteriorated. There is also a problem that, when such optical low pass filter is provided, the operating section will become bulky, the weight will increase and the operation will become difficult.

SUMMARY OF THE INVENTION

An object of the present invention is to provide a network pattern reducing apparatus wherein network patterns by a fiber bundle in an endoscope image transmitted by an image guide made of the above mentioned fiber bundle can be reduced without deteriorating the picture quality.

Another object of the present invention is to provide a network pattern reducing apparatus wherein network patterns can be reduced without reducing operability.

The network pattern reducing apparatus of the present invention reduces network images caused by a fiber bundle in an endoscope image obtained by imaging an object image transmitted by an image guide made of the above mentioned fiber bundle and comprises a region separating means for separating the above mentioned endoscope image into a representative region included in a light transmitting region corresponding to a light transmitting section of an optical fiber forming the above mentioned fiber bundle and representing the above mentioned light transmitting region and a non-representative region other than this representative region and a means for replacing the image data of the above mentioned non-representative region in the above mentioned endoscope image with other image data.

When the endoscope image is separated into a representative region representing a light transmitting region of an optical fiber and a non-representative region other than this representative region by the above mentioned region separating means and the image data of the above mentioned non-representative region are replaced with other image data, the network patterns will be reduced or removed without reducing the resolution of the image.

BRIEF DESCRIPTION OF THE DRAWINGS

FIGS. 1 to 36 relate to the first embodiment of the present invention.

FIG. 1 is a block diagram showing a schematic formation of this embodiment.

FIG. 2 is a side view showing the general formation of an endoscope system.

FIG. 3 is an explanatory view showing the formations of a fiber scope and television camera.

FIG. 4 is an explanatory view showing an operating section of a fiber scope with a solid state imaging device built-in.

FIGS. 5 to 7 relate to the first example of a separating means.

FIG. 5 is a block diagram of the separating means.

FIG. 6 is an explanatory view showing core sections and noncore sections in an endoscope image and blocks set in this endoscope image.

FIG. 7 is a histogram of the brightnesses of pixels in an endoscope image.

FIGS. 8 and 9 relate to the second example of the separating means.

FIG. 8 is a block diagram of the separating means.

FIG. 9 is a characteristics diagram showing the fluctuation of the brightness of an endoscope image signal.

FIGS. 10 to 12 relate to the third example of the separating means.

FIG. 10 is a block diagram of the separating means.

FIG. 11 is a characteristics diagram showing the fluctuation of the brightness of an endoscope image signal.

FIG. 12 is a characteristics diagram showing the fluctuation of the chroma of an endoscope image signal.

FIGS. 13 to 15 relate to the fourth example of the separating means.

FIG. 13 is a block diagram of the separating means.

FIG. 14 is a characteristics diagram showing the output of a correlator.

FIG. 15 is an explanatory view showing a principle of determining a core thickness from the output of the correlator.

FIGS. 16 and 17 relate to the fifth example of the separating means.

FIG. 16 is a block diagram of the separating means.

FIG. 17 is an explanatory view for explaining the operation of the separating means.

FIG. 18 is a block diagram showing the sixth example of the separating means.

FIGS. 19 and 20 relate to the seventh example of the separating means.

FIGS. 19 is a block diagram of the separating means.

FIG. 20 is an explanatory view for explaining the operation of the separating means.

FIGS. 21 and 22 relate to the eighth example of the separating means.

FIG. 21 is a block diagram of the separating means.

FIG. 22 is an explanatory view showing the operating section of a fiber scope with a solid state imaging device built-in.

FIG. 23 is a block diagram showing the ninth example of the separating means.

FIG. 24 is a block diagram showing the tenth example of the separating means.

FIGS. 25 and 26 relate to the first example of a correcting means.

FIG. 25 is a block diagram of the correcting means.

FIG. 26 is an explanatory view for explaining the operation of the correcting means.

FIGS. 27 and 28 relate to the third example of the correcting means.

FIG. 27 is a block diagram of the correcting means.

FIG. 28 is an explanatory view for explaining the operation of the correcting means.

FIG. 29 is a block diagram showing the fourth example of the correcting means.

FIGS. 30 and 31 relate to the fifth example of the correcting means.

FIG. 30 is a block diagram of the correcting means.

FIG. 31 is an explanatory view for explaining the operation of the correcting means.

FIGS. 32 and 33 relate to the sixth example of the correcting means.

FIG. 32 is a block diagram of the correcting means.

FIG. 33 is an explanatory view for explaining the operation of the correcting means.

FIG. 34 is a block diagram showing the seventh example of the correcting means.

FIG. 35 is a block diagram showing the eighth example of the correcting means.

FIG. 36 is a block diagram showing the ninth example of the correcting means.

FIG. 37 is a block diagram showing an essential part of an endoscope system.

FIG. 38 is an explanatory view showing an endoscope image projected on a solid state imaging device.

FIGS. 39 to 41 are explanatory views for respectively explaining the operation of the network reducing apparatus of this embodiment.

DETAILED DESCRIPTION OF THE PREFERRED EMBODIMENTS

Figure 3:
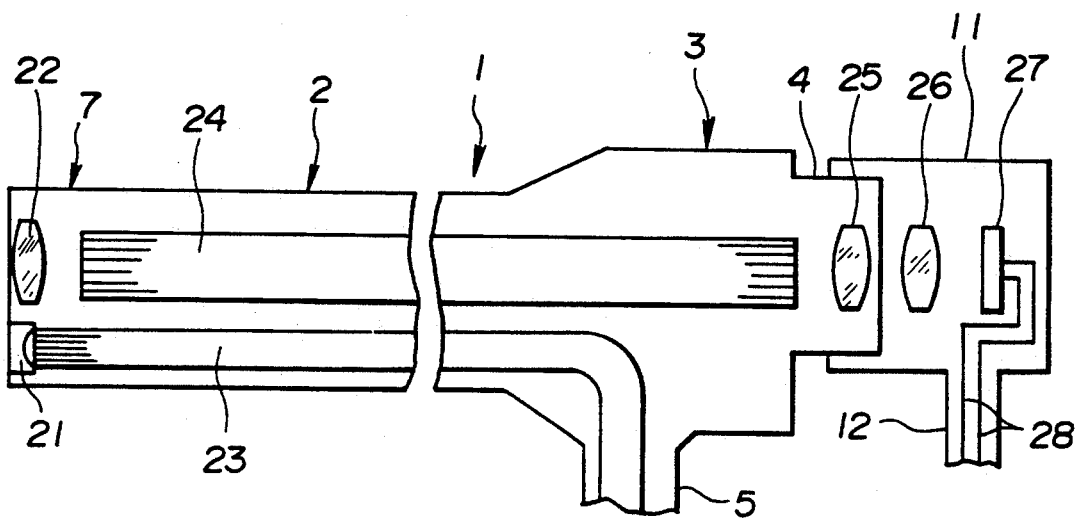

The embodiments of the present invention shall be explained in the following with reference to the drawings.

As shown in FIG. 2, an endoscope system provided with the first embodiment comprises a fiber scope 1 having an image transmitting means formed of a fiber bundle, a light source apparatus 10 feeding an illuminating light transmitting means of this fiber scope 1 with an illuminating light, a television camera 11 removably connected to an eyepiece section 4 of this fiber scope 1 and having an imaging means built-in, a camera controlling unit (abbreviated as CCU hereinafter) 13 connected to the above mentioned television camera 11 through a cable 12 and processing signals for the imaging means of this television camera 11, a network (pattern) reducing apparatus 15 for reducing network patterns in an endoscope image by inputting a video signal output from this CCU 13 and a monitor 6 for displaying an endoscope image by inputting a video signal output from this network reducing apparatus 15.

The above mentioned fiber scope 1 comprises an elongate flexible insertable section 2, an operating section 3 connected to this insertable section 2 at the rear end, an eyepiece section 4 provided at the rear end of this operating section, a light guide cable 5 extended out of the side of the above mentioned operating section 3 and a light source connector 6 provided at the end of this light guide cable 5. The above mentioned light source connector 6 is removably connected to the above mentioned light source apparatus 10. A rigid tip section 7 is provided on the tip side of the above mentioned insertable section 2 and a bendable section 8 is provided in the rear of this tip section 7. Also, the operating section 3 is provided with a bending operating knob 9 for bending the above mentioned bendable section 8 vertically and horizontally.

As shown in FIG. 3, the tip section 7 of the above mentioned insertable section 2 is provided with a light distributing lens 21 and objective lens 22. A light guide 23 consisting of a fiber bundle is connected to the above mentioned light distributing lens 21 at the rear end, is inserted through the insertable section 2, operating section 3 and light guide cable 5 and is connected at the entrance end to the light source connector 6.

The illuminating light emitted from the above mentioned light source apparatus 10 will be transmitted to the tip section 7 side end surface by the light guide 23 as an illuminating light transmitting means and will be emitted to the object side through the light distributing lens 21 further from this end surface to illuminate the above mentioned object to be imaged. The tip surface of an image guide 24 consisting of a fiber bundle is arranged in the image forming position of the above mentioned objective lens 22. This image guide 24 is inserted through the insertable section 2 and operating section 3 and is opposed at the rear end to an eyepiece lens 25 within the eyepiece section 4 so that the object image formed by the above mentioned objective lens 22 will be transmitted to the end surface on the eyepiece section 4 side by the image guide 24 and will be able to be observed from the eyepiece section 4.

The television camera 11 connected to the above mentioned eyepiece section 4 comprises an image forming lens 26 forming the object image observed in the above mentioned eyepiece section 4 and such solid state imaging device 27 as a CCD converting the object image formed by this image forming lens 26 to an electric signal. Signal lines 28 connected to the above mentioned solid state imaging device 27 are to be connected to the CCU 13 through the cable 12 so that the above mentioned solid state imaging device 27 will be driven by the above mentioned CCU 13 and the output signal of this solid state imaging device 27 will be processed to be a video signal by the CCU 13.

The above mentioned eyepiece lens 25 and image forming lens 26 will form on the imaging surface of the solid state imaging device 27 the object image (optical image) transmitted to the end surface on the eyepiece section 4 side by the image guide 24, as mentioned above, and will form the image of the network-like patterns of the fiber bundle on the rear end surface of the image guide 24. Therefore, the output signal of the solid state imaging device 27 will become an image including the network patterns together with the object image.

Figure 4:
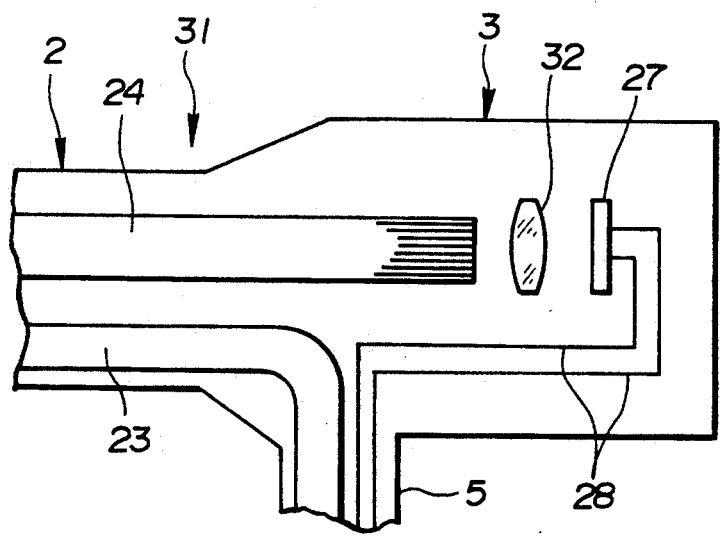

The network reducing apparatus 15 of this embodiment can be applied not only to the above mentioned fiber scope 1 and television camera 11 but also to the solid state imaging device built-in type fiber scope 31 as shown in FIG. 4. This fiber scope 31 has no eyepiece section 4 and is provided within the operating section 3 with an image forming lens 32 opposed to the rear end surface of the image guide and the solid state imaging device 27 arranged in the image forming position of this image forming lens 32 so that the object image transmitted to the operating section 3 by the image guide 24 will be imaged by the solid state imaging device 27. The signal lines 28 connected to the above mentioned solid state imaging device 27 is to be connected to the CCU 13 through the light guide cable 5. The other formations of the fiber scope 31 are the same as of the above mentioned fiber scope 1 and television camera 11.

As the fiber bundle forming the image guide 24 of the above mentioned fiber scope 1 or 31 is made by closely bundling several tens of thousands of fine optical fibers forming respective pixels, where such network patterns formed by the above mentioned fiber bundle described above will appear in the endoscope image obtained by imaging by the solid state imaging device 27 the image transmitted by this image guide 24. In this embodiment, such network patterns are to be electrically reduced by the above mentioned network reducing apparatus 15.

As shown in FIG. 1, the above mentioned network reducing apparatus 15 comprises a core section/non-core section separating means 41 for separating the endoscope image transmitted from the CCU 13 into a light transmitting core section (or a representative region representing the core section) and such noncore section (or another non-representative region than the representative region) as a clad section other than this core section and a correcting means 42 controlled by this separating means 41 and replacing at least the image data of the above mentioned noncore section in the above mentioned endoscope image transmitted from the CCU 13 with other image data which are output to the monitor 16. The above mentioned core section is a projected image of a core of an optical fiber forming the fiber bundle of the image guide 24.

In case the solid state imaging device 27 used has a large number of pixels, a plurality of pixels of the solid state imaging device 27 will exist within the above mentioned core section and the endoscope image imaged with this solid state imaging device 27 will be able to be separated into a core section and a noncore section.

The first to tenth examples of the above mentioned core section/noncore section separating means 41 shall be explained in the following with reference to FIGS. 5 to 24. In the following explanation, the same components shall bear the same reference numerals and shall not be explained in detail in and after the second time.

Figure 5:
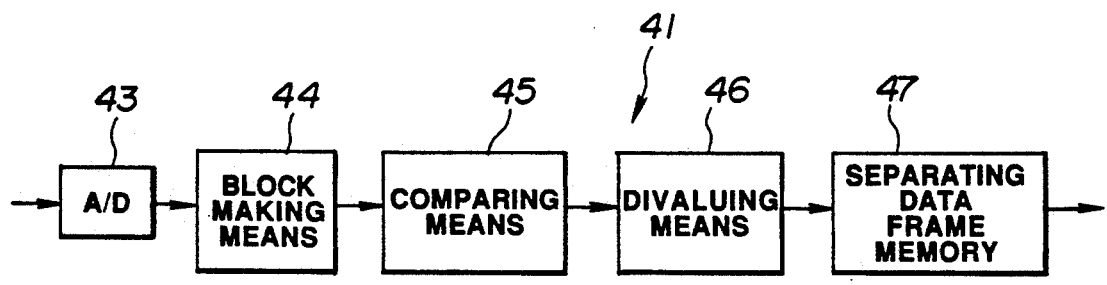
Figure 6:
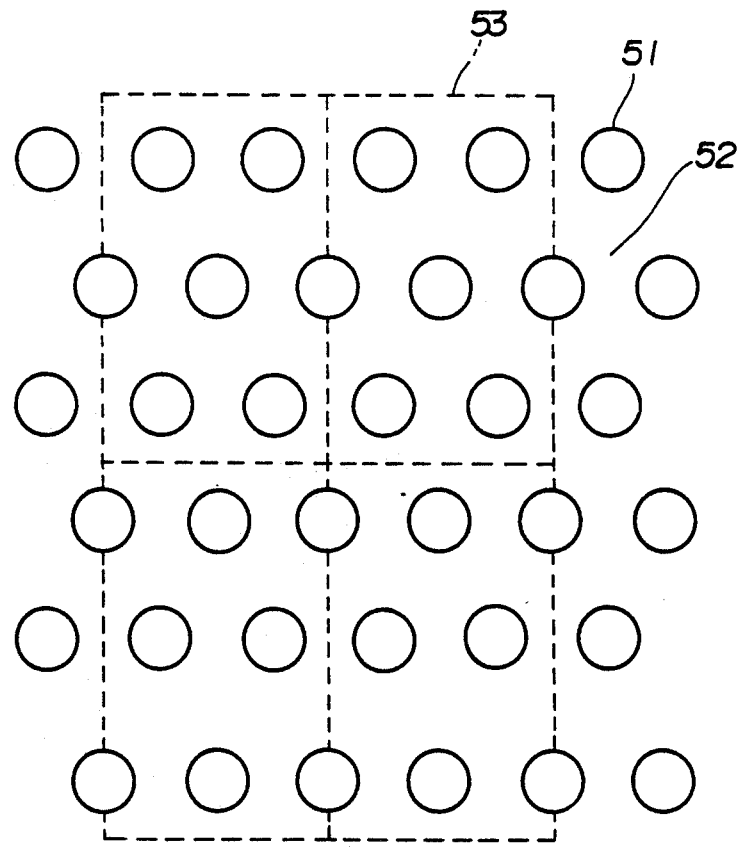
Figure 7:
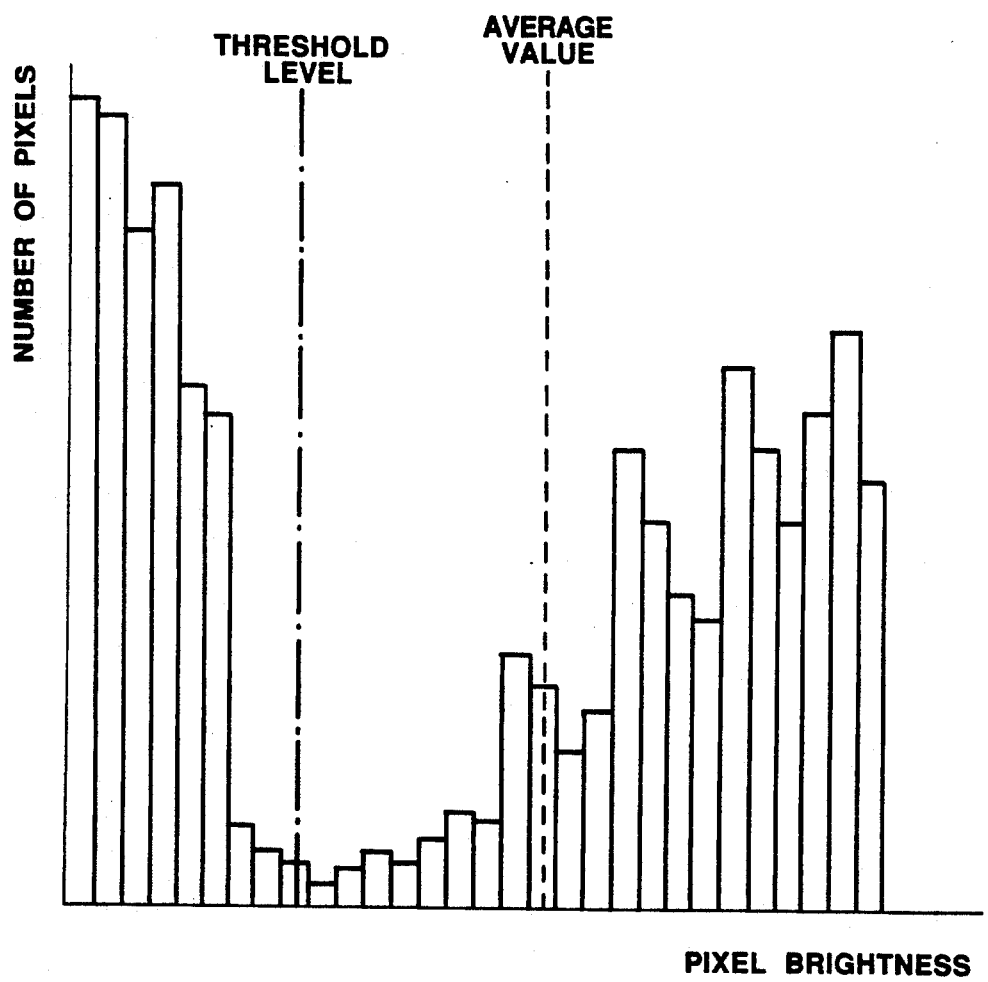

FIGS. 5 to 7 show the first example.

In this example, the entire endoscope image is divided into blocks. If the average value of the brightness of the pixels within each block is above a predetermined level, the core section within the block will be considered to be illuminated with a light and the image within the block will be divalued to be separated into a core section and noncore section.

As shown in FIG. 5, the core section/noncore section separating means 41 comprises an A/D converter 43 converting the endoscope image from the CCU 13 to a digital image, a block making means 44 dividing the output image of this A/D converter 43 into a plurality of blocks, a comparing means 45 comparing the average value of the brightness of the pixels within the block with a predetermined level in each block divided by this block making means 44, a divaluing means 46 divaluing the image within the block in case the above mentioned average value is detected by this comparing means 45 to be above the above mentioned predetermined value and a separated data frame memory 47 memorizing the output data of this divaluing means 46 as separated data of the core section and noncore section.

The operation of this example shall be explained in the following.

The endoscope image from the CCU 13 is converted to a digital image by the A/D converter 43 and is divided into a plurality of blocks by the block making means 44. FIG. 6 shows core sections 51 and noncore sections 52 in the endoscope image and blocks 53 set in the endoscope image by the block making means 44. Then, the average value of the brightness of the pixels within the block 53 is determined by the comparing means 45 in each block 53 divided by the above mentioned block making means 44. In case this average value is compared with a predetermined level to be above it, the image within the block will be divalued by the divaluing means 46.

FIG. 7 shows a histogram of the brightness of pixels in an endoscope image. As understood from this histogram, the pixels in the endoscope image are separated into bright pixels corresponding to the core sections 51 and dark pixels corresponding to the noncore sections 52. Therefore, by divaluing the endoscope image with such a proper threshold level as is shown in this histogram, the endoscope image can be separated into core sections 51 and noncore sections 52. However, as the core sections 51 also become dark in the dark region in the endoscope image, in some case, the endoscope image will not be able to be separated into the core sections 51 and noncore sections 52.

Therefore, in this example, in each block 53, the average value of the brightness of the pixels within the block 53 is compared with a predetermined level to judge whether the block 53 is a bright region or a dark region and, only in case the above mentioned average value is above the predetermined level, the mis-operation will be prevented by the divaluation. The core section 51 and noncore section 52 separating data obtained by the above mentioned divaluing means 46 are memorize-d in the separating data frame memory 47 to be used to control the correcting means 42.

Figure 8:
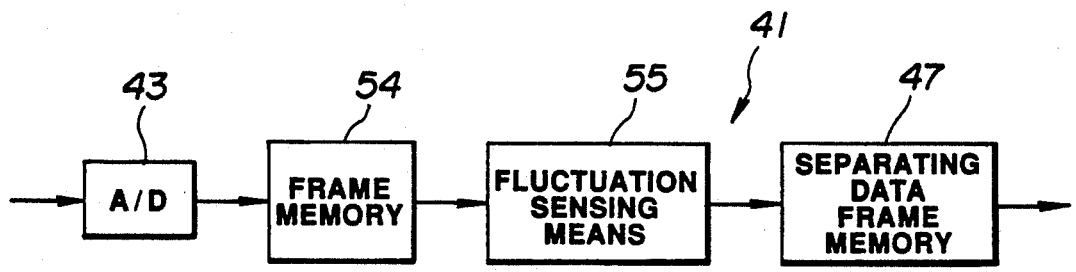
Figure 9:
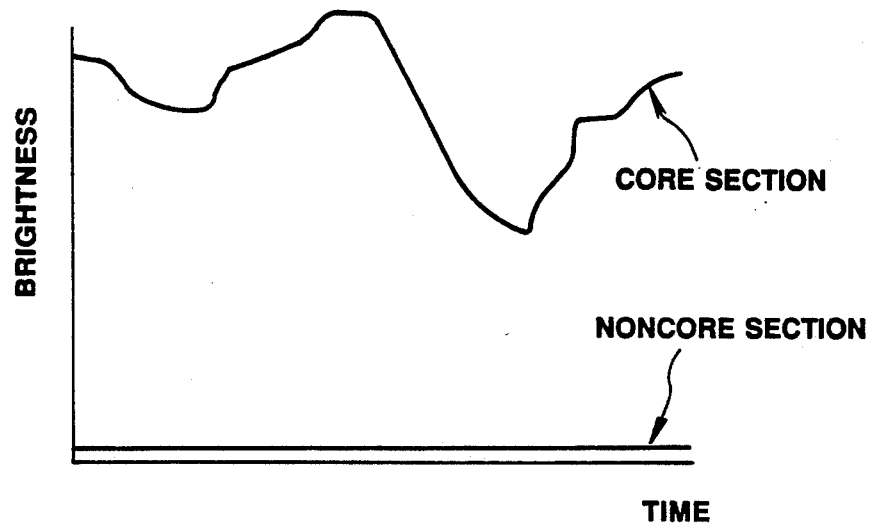

FIGS. 8 and 9 show the second example.

In this example, the region in which the time series data of the pixels of an endoscope image fluctuate is considered to be a core section and the region in which the above mentioned time series data do not fluctuate and a dark state is kept is considered to be a noncore section.

As shown in FIG. 8, the core section/noncore section separating means 41 comprises an A/D converter 43 converting the endoscope image from the CCU 13 to a digital image, a frame memory 54 memorizing the output image of this A/D converter 43, a fluctuation sensing means 55 sensing the fluctuation of the endoscope image signal read out of this frame memory 54, that is, of the time series data of the pixels and a separating data frame memory 47 wherein whether a core section or noncore section is judged by judging whether the fluctuation is above a predetermined level or not in this fluctuation sensing means 55 and the output data judged by this fluctuation sensing means 55 are memorized as separating data.

As shown in FIG. 9, within the core section, the time series data of the pixel fluctuate but, within the noncore section, the time series data of the pixel do not fluctuate and a dark state is kept. Therefore, in this example, by the fluctuation sensing means 55, the region in which the time series data of the pixel of the endoscope image from the frame memory 54 fluctuate is considered to be a core section, the region in which the above mentioned time series data do not fluctuate and a dark state is kept is considered to be a noncore section and the core section and noncore section are separated from each other.

Figure 10:
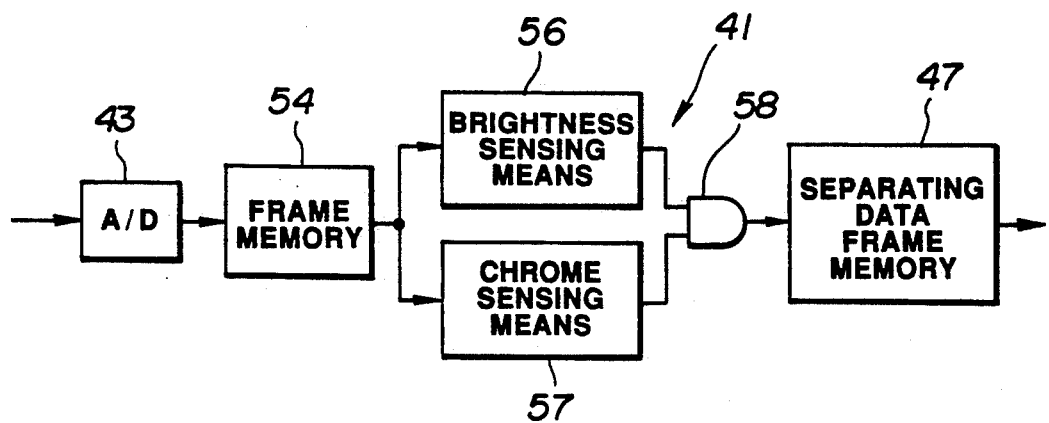
Figure 11:
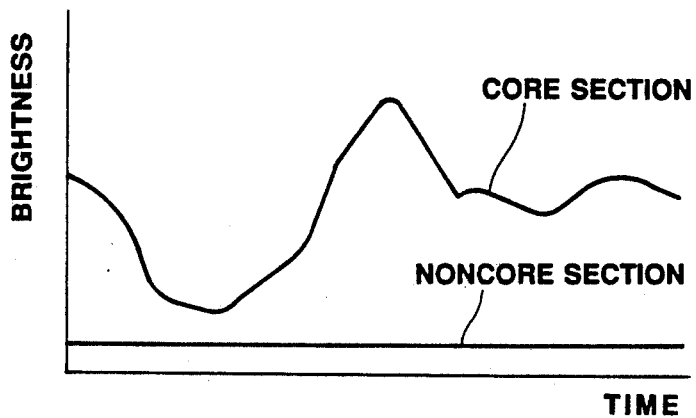
Figure 12:
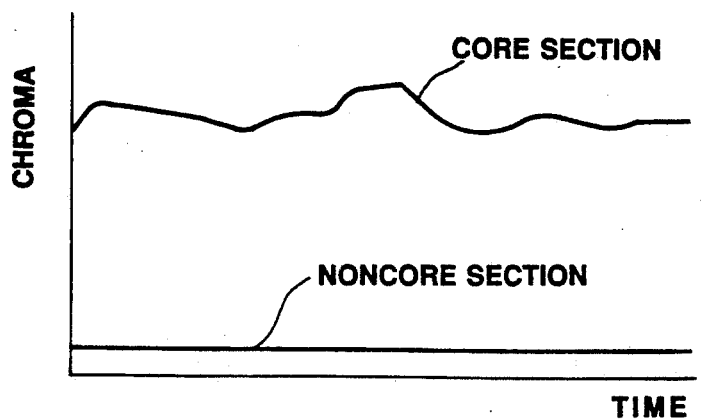

FIGS. 10 to 12 show the third example.

In this example, the region dark and low in the chroma in the endoscope image is considered to be a noncore section.

As shown in FIG. 10, the core section/noncore section separating means 41 in this example comprises an A/D converter 43 converting the endoscope image from the CCU 13 to a digital image, a frame memory 54 memorizing the output image of this A/D converter 43, a brightness sensing means 56 sensing, for example, with a luminance level the brightness of the pixels of the endoscope image read out of this frame memory 54, a chroma sensing means 57 sensing the chroma of the pixels of the endoscope image read out of the above mentioned frame memory 54, an AND gate 58 determining the logical product of the output of the above mentioned brightness sensing means 56 and the output of the chroma sensing means 57 and a separating data frame memory 47 memorizing the output data of this AND gate 58 as separating data.

As shown in FIG. 11, in the case of observing a colored bright object, within the core section, the pixel will be bright but, within the noncore section, the pixel will be dark. Also, as shown in FIG. 12, within the core section, the pixel will be high in the chroma but, within the noncore section, the pixel will be low in the chroma. Therefore, in this example, by the brightness sensing means 56, chroma sensing means 57 and AND gate 58, the region dark and low in the chroma in the endoscope image from the frame memory 54 is sensed and is considered to be a noncore section, the other region is considered to be a core section and thereby the core section and noncore section are separated from each other.

Figure 13:
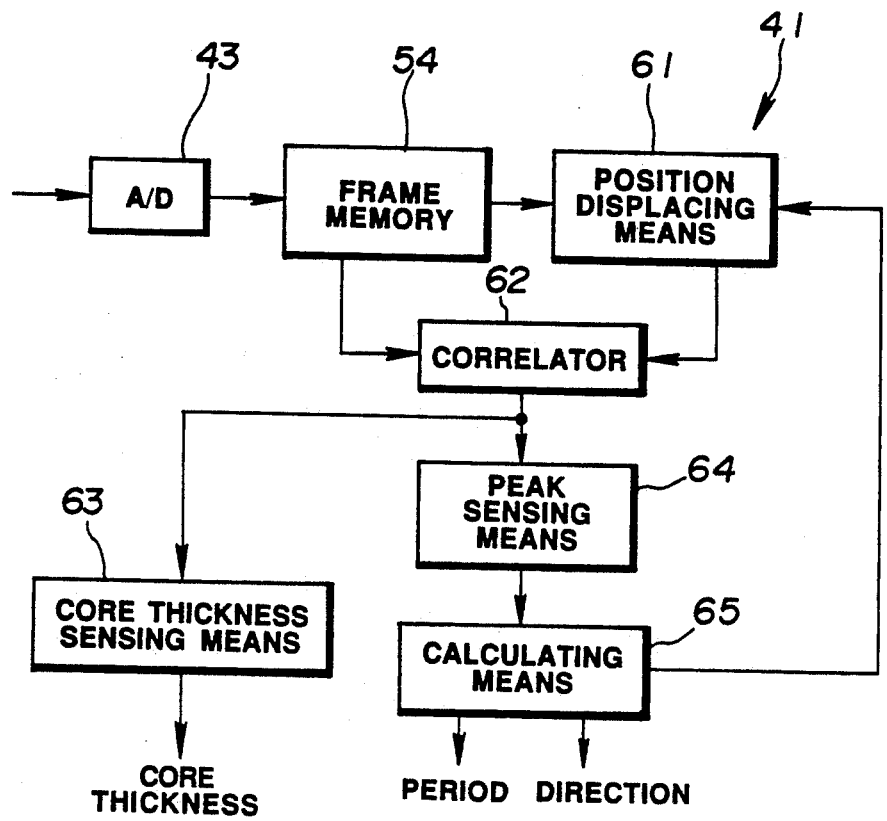
Figure 14:
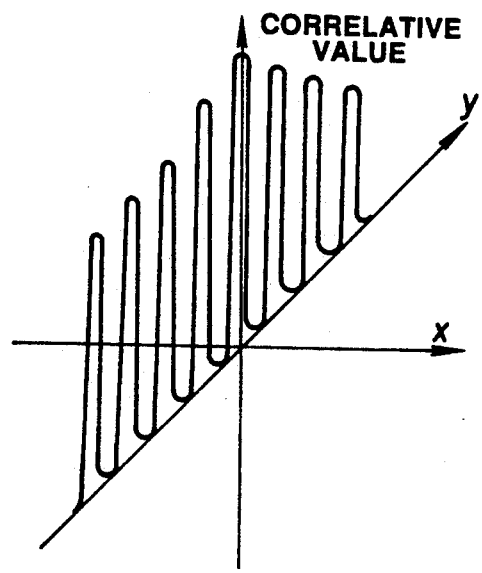
Figure 15:
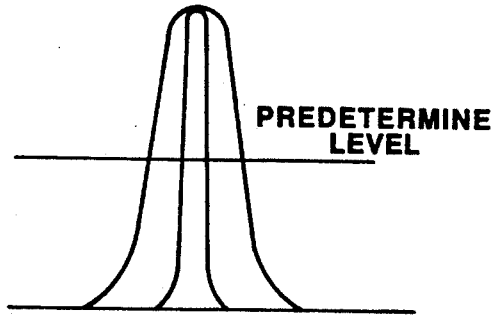

FIGS. 13 to 15 show the fourth example.

In this example, the core section is detected from the secondary self correlation of the endoscope image.

As shown in FIG. 13, the core section/noncore section separating means 41 in this example comprises an A/D converter 43 converting the endoscope image from the CCU 13 to a digital image, a frame memory 54 memorizing the output image of this A/D converter 43, a position displacing means 61 displacing in the x direction and y direction intersecting at right angles the endoscope image read out of this frame memory 54, a correlator 62 determining the correlation of the endoscope image read out of the above mentioned frame memory 54 and the displaced endoscope image from the above mentioned position displacing means 61, a thickness sensing means 63 determining the thickness of the core section from the output of this correlator 62, a peak sensing means 64 determining the peak position of the output of the above mentioned correlator 62 and a calculating means 65 determining the period and arranging direction of the core sections from the output of the above mentioned peak sensing means 64.

In this example, the endoscope image is displaced in the two-dimensional directions by the position displacing means 61 and the correlation of the original endoscope image and the displaced endoscope image, that is, the self correlation of the endoscope image is determined by the correlator 62. The core sections are so regularly arranged that the output of the above mentioned correlator 62 will vary periodically in response to the displacement (x, y) of the endoscope image as shown in FIG. 14.

By the way, in FIG. 14, only the variation in the y direction is shown but the peak of the correlation appears two-dimensionally. As the width of the output waveform of the above mentioned correlator 62 corresponds to the thickness of the core section, in the core thickness sensing means 63, as shown in FIG. 15, the thickness of the core section is determined by determining the width on a predetermined level of the output waveform of the correlator 62. Also, the calculating means 65 determines the period and arranging direction of the core section from the period and arranging direction of the peak position of the output waveform of the correlator 62 determined by the peak sensing means 64.

Figure 16:
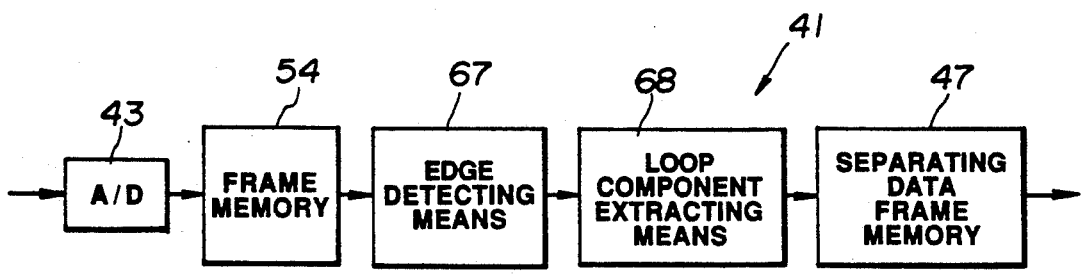

FIGS. 16 and 17 show the fifth example.

In this example, the core section is detected by extracting the loop component above a fixed size after detecting the edge of the endoscope image.

As shown in FIG. 16, the core section/noncore section separating means 41 comprises an A/D converter 43 converting the endoscope image from the CCU 13 to a digital image, a frame memory 54 memorizing the output image of this A/D converter 43, an edge detecting means 67 detecting the edge of the endoscope image read out of this frame memory 54, a loop component (closed region) extracting means 68 extracting the loop component (closed loop region) above a predetermined area size from the output image of this edge detecting means 67 and a separating data frame memory 47 memorizing as separating data the output data of this loop component extracting means 68.

Figures 17A, 17B, 17C:
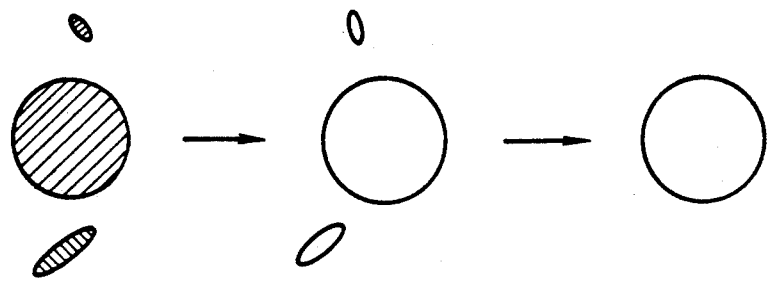

In this example, by the edge detecting means 67, the edge of such endoscope image as is shown in FIG. 17a is detected and an image including such loop component as is shown in FIG. 17b is obtained. By the loop component extracting means 68, the loop component above a predetermined size is extracted from the output image of the above mentioned edge detecting means 67 and thereby only the loop component corresponding to the edge of such core section as is shown in FIG. 17c is extracted. This loop component is memorized in the separating data frame memory as separating data showing the edge of the core section.

Figure 18:
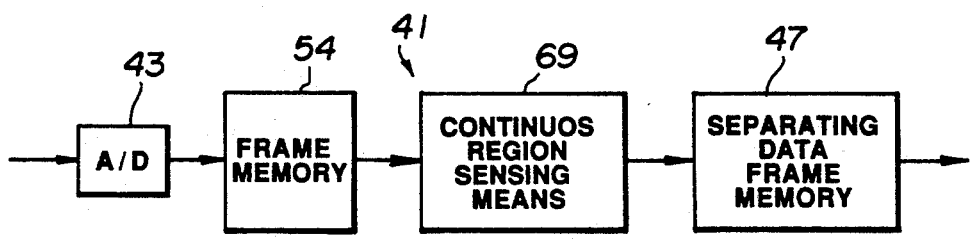

FIG. 18 shows the sixth example.

In this example, the continuous region of bright pixels in the endoscope image is considered to be a core section.

The core section/noncore section separating means 41 in this example comprises an A/D converter 43 converting the endoscope image from the CCU 13 to a digital image, a frame memory 54 memorizing the output image of this A/D converter 43, a continuous region sensing means 69 detecting bright pixels, for example, pixels of a luminance level above a predetermined value from the endoscope image read out of this frame memory 54 and extracting the continuous region by detecting the time when the pixels are continuous and a separating data frame memory 47 memorizing as separating data the output data of this continuous region sensing means 69.

As the core section in the endoscope image is a continuous region of bright pixels, in this example, by the continuous region sensing means, the above mentioned continuous region corresponding to the core section is extracted and the non-continuous region is judged to be a noncore section.

Figure 19:
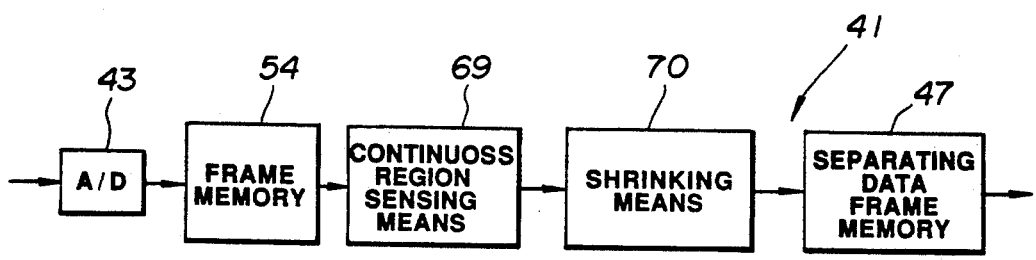
Figure 20:
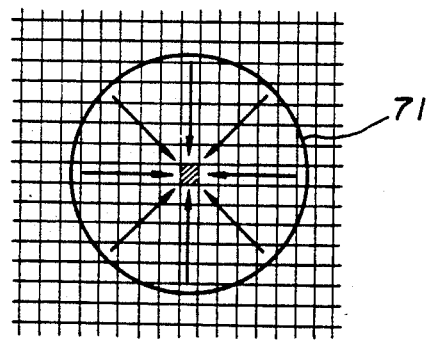

FIGS. 19 and 20 show the seventh example.

In this example, as shown in FIG. 19, a shrinking means 70 shrinking processing the continuous region extracted by this continuous region sensing means 69 is provided in the rear step of the continuous region sensing means 69 in the above mentioned sixth example to memorize the output data of this shrinking means 70 in the separating data frame memory 47.

In this example, by the shrinking means 70, as shown in FIG. 20, the continuous region 71 extracted by the continuous region sensing means 69 is processed to be shrunk and, when it is shrunk to one point, this point is considered to be the center of the core section.

Figure 21:
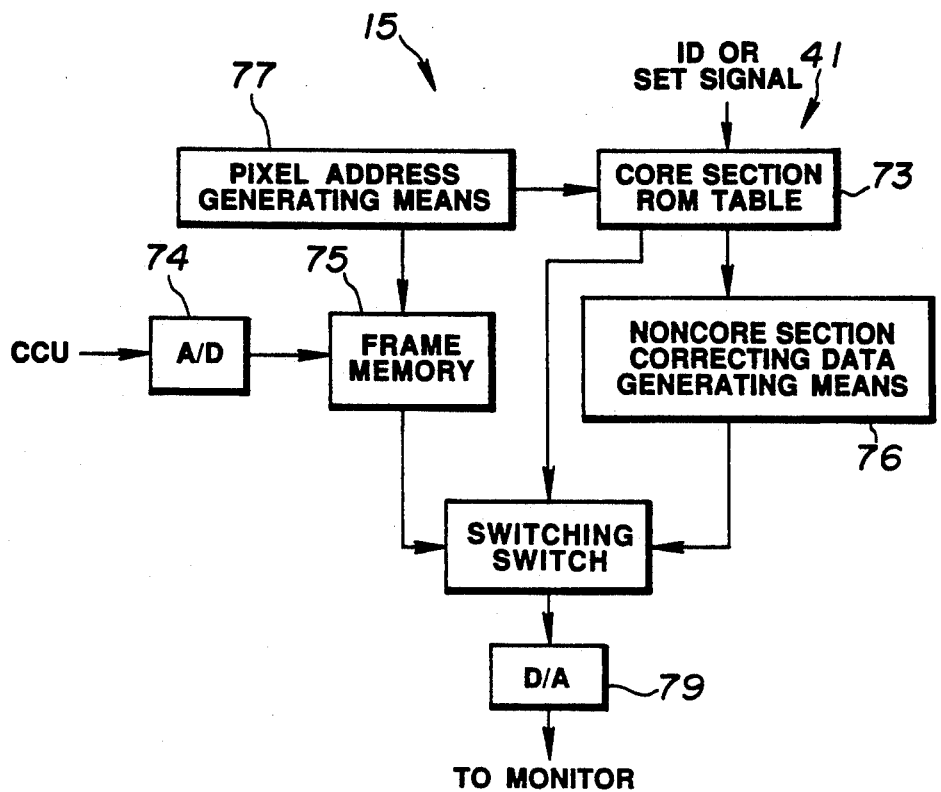
Figure 22:
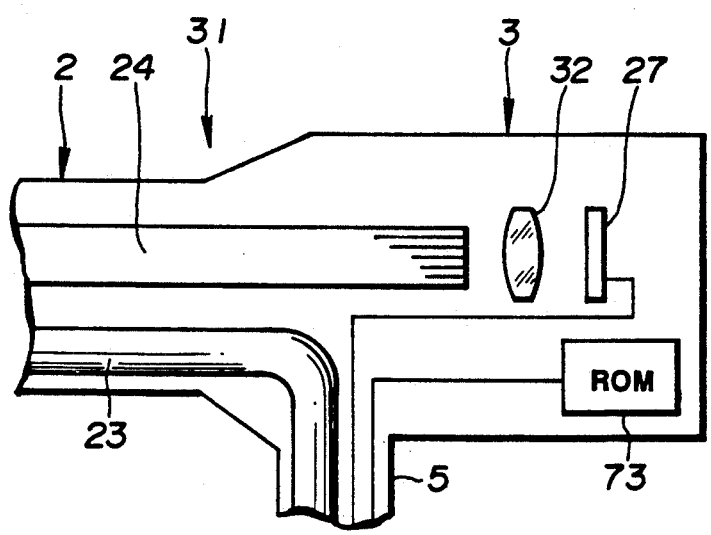

FIGS. 21 and 22 show the eighth example.

In this example, the position of the solid state imaging device 27 can be directly fixed for the fiber bundle forming the image guide 24 and the position information of the core section and noncore section inherent to the fiber scope is read out of the memory having memorized such information in advance and is used to judge the regions of the core section and noncore section.

As shown in FIG. 21, the core section/noncore section separating means 41 in this example is provided with a core section ROM table 73 having memorized in advance the position information of the core section and noncore section inherent to respective fiber scopes. This core section ROM table 73 outputs the position information of the core section and noncore section inherent to the fiber scope to be used in response to the identifying signal (ID) from the fiber scope to be used or the set signal from the switch to be manually set.

The above mentioned core section ROM table 73 may be built-in in the fiber scope instead of being provided within the network reducing apparatus 15. Particularly, as shown in FIG. 22, in the case of applying it to the fiber scope 31 having the solid state imaging device 27 built-in, it will be more effective to have the core section ROM table 73 built-in in the fiber scope 31.

By the way, in FIG. 21 is shown a general formation example of the network reducing apparatus 15 including a correcting means 42. This network reducing apparatus 15 comprises an A/D converter 74 converting the endoscope image from the CCU 13 to a digital image, a frame memory 75 memorizing the output image of this A/D converter 74, the above mentioned core section ROM table 73, a noncore section correcting data generating means 76 generating noncore section correcting data in response to the output of this core section ROM table 73, a pixel address generating means 77 generating the addresses of the read-out pixels of the above mentioned frame memory 75 and core section ROM table 73, a switching switch 78 switching and outputting the output data of the above mentioned frame memory 75 and the output data of the noncore section correcting data generating means 76 and a D/A converter 79 converting the output of this switching switch 78 to an analog signal to be output to the monitor 16.

By the way, the above mentioned switching switch 78 is switched by the output of the core section ROM table 73.

In this example, the endoscope image from the CCU 13 is memorized in the frame memory 75 through the A/D converter 74 and, on the core section, the output data of the frame memory 75 are output through the switching switch 78. On the other hand, on the noncore section, the noncore section correcting data are generated from the noncore section correcting data generating means 76 in response to the output of the core section ROM table 73 and are output through the switching switch 78.

Figure 23:
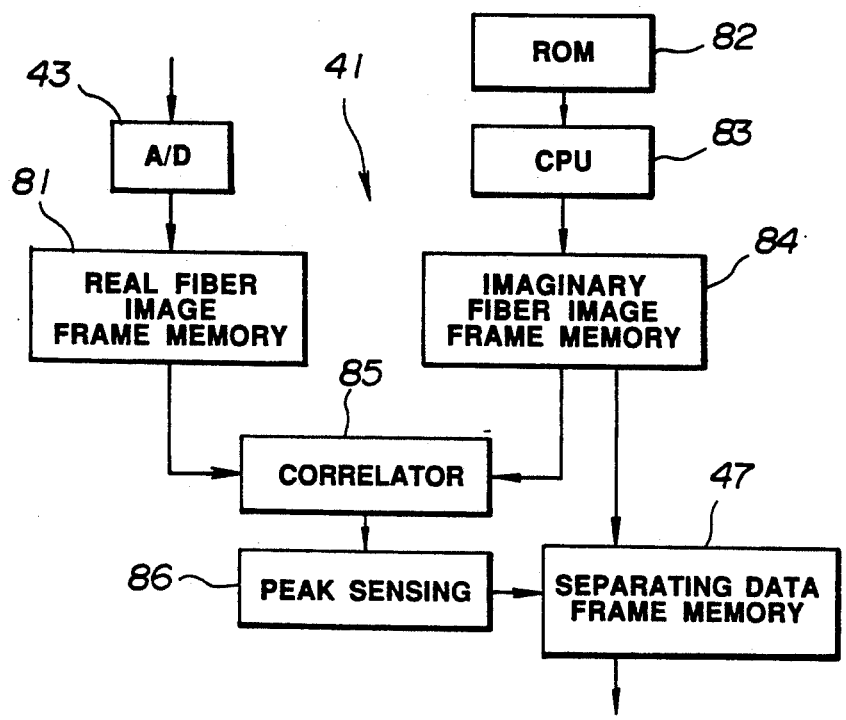

FIG. 23 shows the ninth example.

In this example, from the data of the period, directivity and core section area of the network of the fiber bundle of the image guide 24 determined by the kind of the fiber scope, a matching imaginary fiber image is made, the correlation with the real fiber image is determined while varying the position and direction of this imaginary fiber image and the data of the core section and noncore section of the imaginary fiber image in the position and direction in which the maximum correlation is obtained are used as the separating data of the core section and noncore section.

The core section/noncore section separating means 41 in this example comprises an A/D converter 43 converting the endoscope image from the CCU 13 to a digital image, a real fiber image frame memory 81 memorizing the output image of this A/D converter 43, a ROM 82 having memorized the data of the period, directivity and core section area of the network of the fiber bundle, a CPU 83 making the imaginary fiber image on the basis of the data of this ROM 82, an imaginary fiber image frame memory 84 memorizing the imaginary fiber image made by this CPU 83, a correlator 85 determining the correlation of the output images of the above mentioned both frame memories 81 and 84, a peak sensing means 86 sensing the peak of the output of this correlator 85 and a separating data frame memory 47 memorizing the output image of the above mentioned imaginary fiber image frame memory 84 in response to the output of this peak sensing means 86.

In this example, the actual fiber image is memorized in the real fiber image frame memory 81 and the imaginary fiber image made by the CPU 83 on the basis of the data of the period, directivity and core area of the network from the ROM 82 is memorized in the imaginary fiber image film memory 84. The correlation with the real fiber image is determined by the correlator 85 while varying the position and direction of the above mentioned imaginary fiber image and the peak of the correlation is sensed by the peak sensing means 86. The imaginary fiber image in the position and direction at the time of this peak is memorized in the separating data frame memory 47 and the data of the core section and noncore section of this imaginary fiber image are used as separating data.

The ROM 82 may be provided in the fiber scope and the imaginary fiber image may be held as a table.

Figure 24:
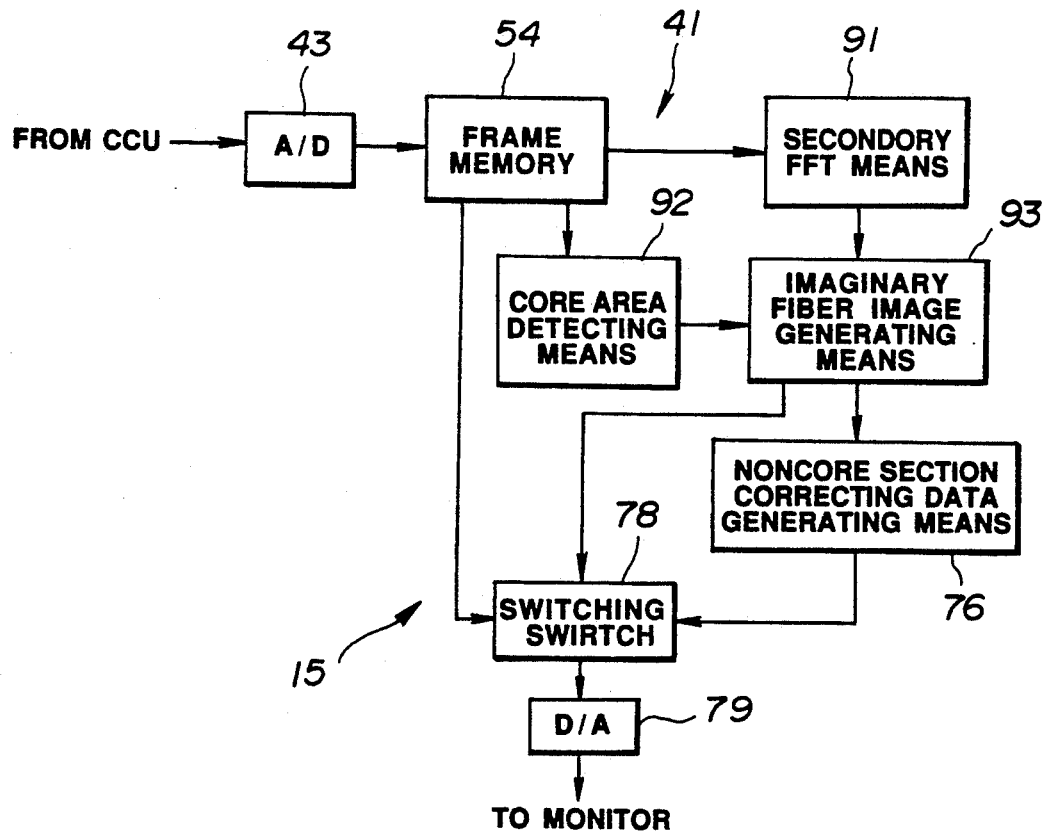

FIG. 24 shows the tenth example.

In this example, the directivity, period and area of the arrangement of the core sections of the fiber bundle of the image guide 24 are sensed from the endoscope image, the imaginary fiber image is made on the basis of these data and, in the same manner as in the above mentioned ninth example, the data of the core section and noncore section of this imaginary fiber image are used as separating data. The core section/noncore section separating means 41 in this example comprises an A/D converter converting the endoscope image from the CCU 13 to a digital image, a frame memory 54 memorizing the output image of this A/D converter 43, a two-dimensional FFT means 91 two-dimensionally high speed Fourier transforming (FFT) the endoscope image read out of this frame memory 54, a core area detecting means 92 detecting the area of the core section from the endoscope image read out of this frame memory 54 and an imaginary fiber image generating means 93 generating the imaginary fiber image on the basis of the output of the above mentioned two-dimensional FFT means 91 and the output of the above mentioned core area detecting means 92.

In this example, by the two-dimensional FFT means 91, the endoscope image is Fourier transformed and the directivity and period of the arrangement of core sections are sensed and, by the core area detecting means 92, the area of the core section is detected. By the imaginary fiber image generating means 93, the imaginary fiber image is formed from the data of the directivity, period and area of the arrangement of the above mentioned core sections and, in the same manner as in the ninth example, the data of the core section and noncore section of this imaginary fiber image are used as separating data.

By the way, in FIG. 24 is shown the general formation example of the network reducing apparatus 15 including a correcting means 42. This network reducing apparatus 15 comprises, in addition to the formation of the above mentioned core section/noncore section separating means 41, a noncore section correcting data generating means 76 generating the noncore section correcting data in response to the output of the above mentioned imaginary fiber image generating means 93, a switching switch 78 switching and outputting the output data of the above mentioned frame memory 54 and the output data of the noncore section correcting data generating means 76 and a D/A converter 79 converting the output of this switching switch to an analog signal to be output to the monitor 16. By the way, the above mentioned switching switch 78 is switched by the output of the imaginary fiber image generating means 93.

In this example, the endoscope image from the CCU 13 is memorized in the frame memory 54 through the A/D converter 43, on the core section, the output data of the frame memory 54 are output through the switching switch 78 and, on the noncore section, the noncore section correcting data from the noncore section correcting data generating means 76 are output through the switching switch 78.

The first to ninth examples of the correcting means 42 shall be explained in the following with reference to FIGS. 25 to 36. By the way, in the following explanation, the same components shall bear the same reference numerals and shall not be explained in and after the second time.

Figure 25:
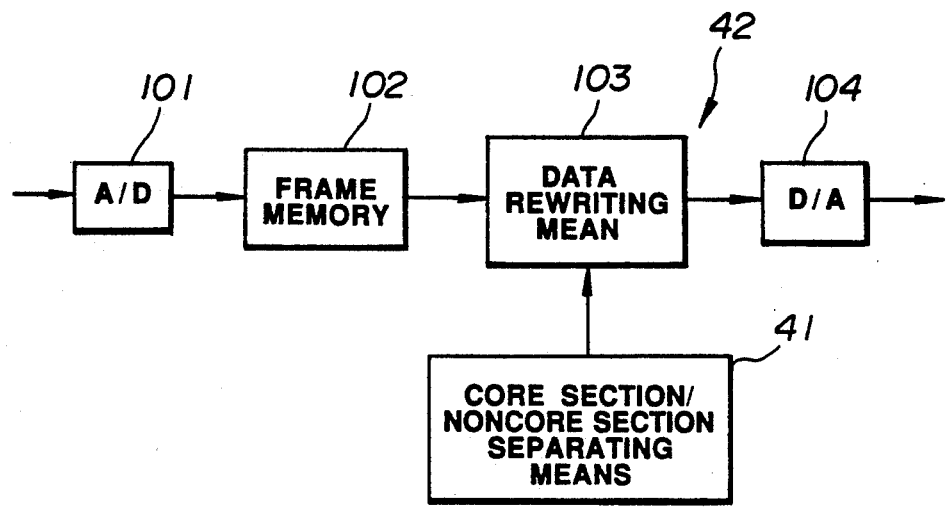
Figure 26:
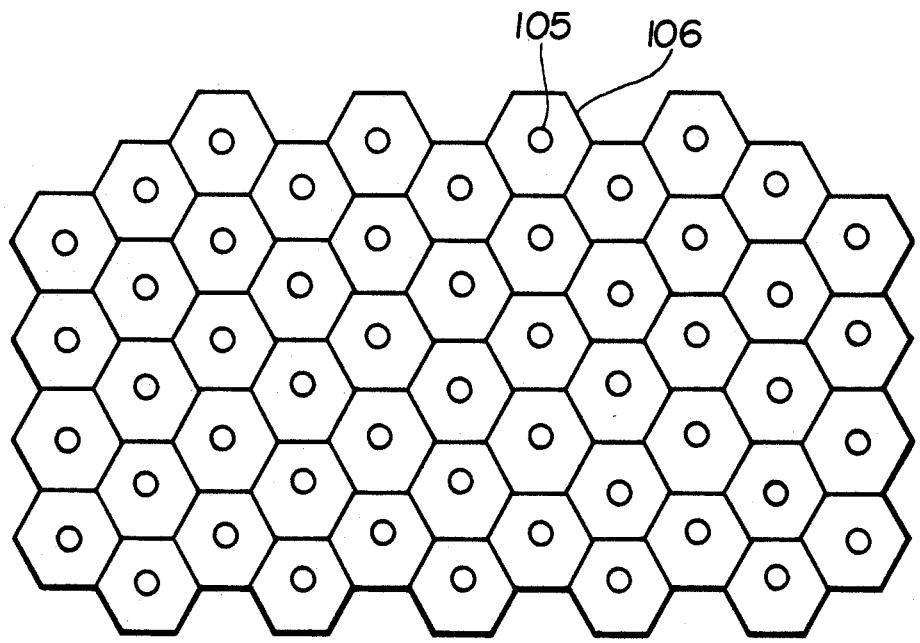

FIGS. 25 and 26 show the first example.

In this example, in the endoscope image, hexagonal regions each having the center of the core section as a center and in contact with one another are considered and the data of the pixels within this hexagonal region are replaced with the average value of the core section.

As shown in FIG. 25, the correcting means 42 in this example comprises an A/D converter 101 converting the endoscope image from the CCU 13 (See FIG. 1) to a digital image, a frame memory 102 memorizing the output image of this A/D converter 101, a data rewriting means 103 rewriting the endoscope image data read out of the above mentioned frame memory 102 on the basis of the output of the core section/noncore section separating means 41 and a D/A converter 104 converting the output of this data rewriting means 103 to an analog signal to be output to the monitor 16.

In this example, the endoscope image from the CCU 13 is converted by the A/D converter 101 to a digital signal to be memorized in the frame memory 102. The endoscope image read out of this frame memory 102 is rewritten in the data by the data rewriting means 103. Concretely, in the above mentioned data rewriting means 103, hexagonal regions 106 each having the center 105 of the core section as a center and in contact with one another are set in the endoscope image as shown in FIG. 26 on the basis of the position information of the core sections from the core section/noncore section separating means 41 and the data of the pixels within this hexagonal region are rewritten to the average value of the core sections so that the network patterns by the noncore sections will be reduced. The endoscope image having had the network patterns reduced is output to the monitor 16 through the D/A converter 104 and is displayed in this monitor 16.

The above mentioned A/D converter 101 and frame memory 102 may be common respectively with the A/D converter and frame memory within the core section/noncore section separating means 41.

The second example shall be explained in the following with reference to FIG. 25.

The formation of this example is substantially the same as of the first example shown in FIG. 25 but is different in the operation of the data rewriting means 103. In the data rewriting means 103 in this example, the pixel of the average value of the core section is considered to exist in the center 105 of the core section shown in FIG. 26 and the other regions than in the above mentioned center 105 are interpolated while adding weight in consideration of the data of the center 105 of the adjacent core section. By the way, there are such interpolating methods as a simple interpolation, spline interpolation and weight adding window interpolation.

Figure 27:
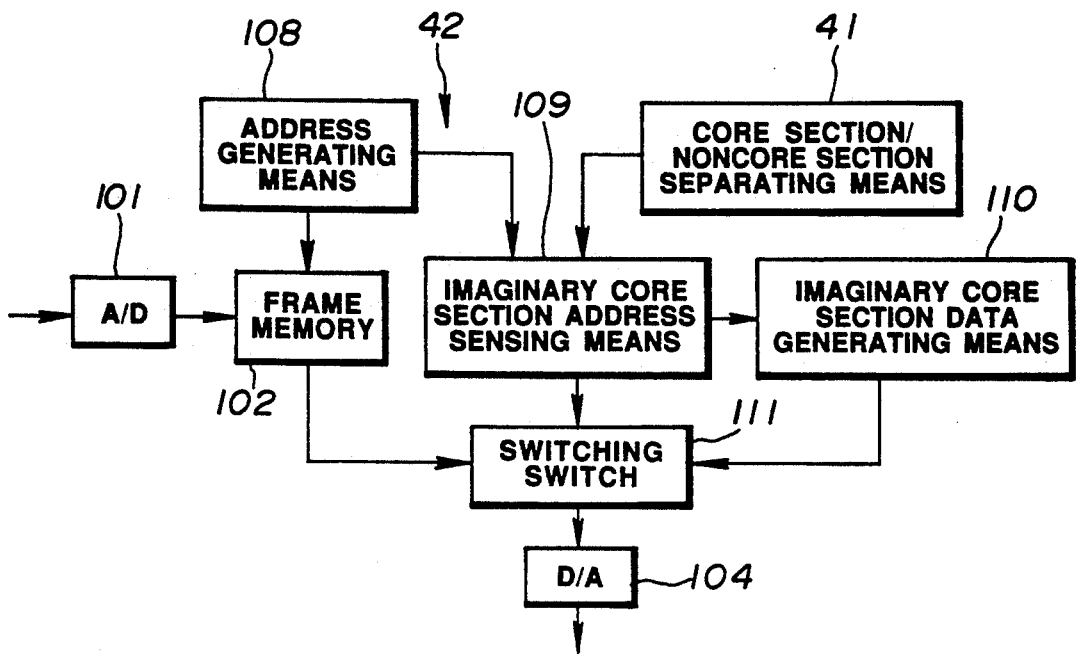
Figure 28:
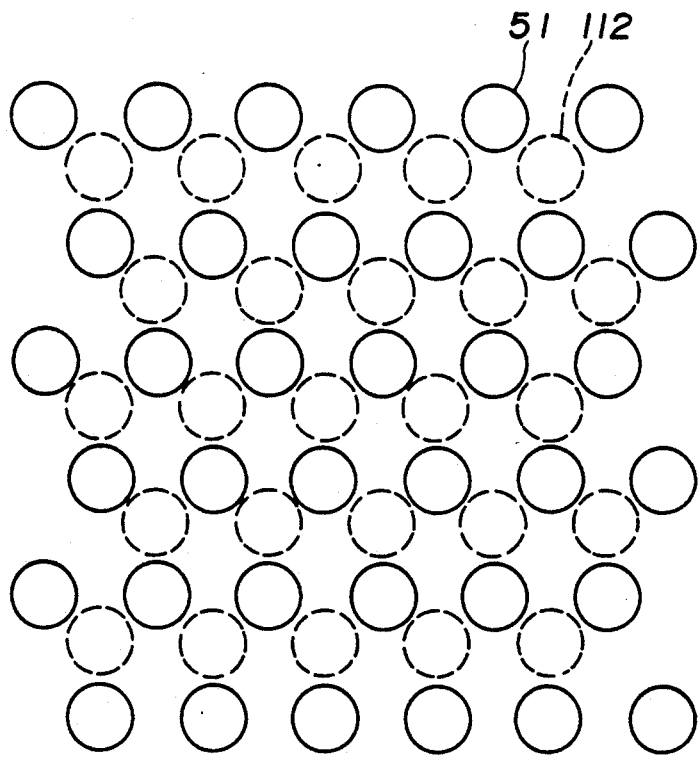

FIGS. 27 and 28 show the third example.

In this example, an imaginary core section is assumed to be between core sections in the endoscope image and the data within this imaginary core section are replaced with various data.

As shown in FIG. 27, the correcting means 42 in this example comprises an A/D converter 101 converting the endoscope image from the CCU 13 to a digital image, a frame memory 102 memorizing the output image of this A/D converter 101 and an address generating means 108 generating the read-out addresses of the above mentioned frame memory 102. This correcting means 42 further comprises an imaginary core section address sensing means 109 sensing the address of the imaginary core section on the basis of the generated addresses of the above mentioned address generating means 108 and the separating data from the core section/noncore section separating means 41, an imaginary core section data generating means 110 generating imaginary core section data in response to the output of the above mentioned imaginary core section address sensing means 109, a switching switch 111 switching and outputting the output of the frame memory 102 and the output of the imaginary core section data generating means 110 in response to the output of the above mentioned imaginary core section address sensing means 109 and a D/A converter 104 converting the output of this switching switch 111 to an analog signal to be output to the monitor 16.

In this example, by the imaginary core section address sensing means 109, the address of the imaginary core section 112 assumed to be between the core sections 51 in the endoscope image as shown in FIG. 28 is sensed on the basis of the generated addresses of the address generating means 108 and the separating data from the core section/noncore section separating means 41. On this imaginary core section 112, by the imaginary core section address sensing means 109, the switching switch 111 is switched and the data from the imaginary core section data generating means 110 are output instead of the data from the frame memory 102.

On the other regions than of the above mentioned imaginary core section, the data from the frame memory 102 are output. The interpolating data by a simple interpolation, spline interpolation or weight adding window interpolation based on the same data as of the adjacent core section 51 or the data of the surrounding core sections 51 are used for the data of the above mentioned imaginary core section 112.

By the way, the imaginary core sections may be of the same size and number as of the actual core sections, may be different in the size from the actual core sections and may be assumed to be a plurality of imaginary core sections between the adjacent core sections.

Figure 29:
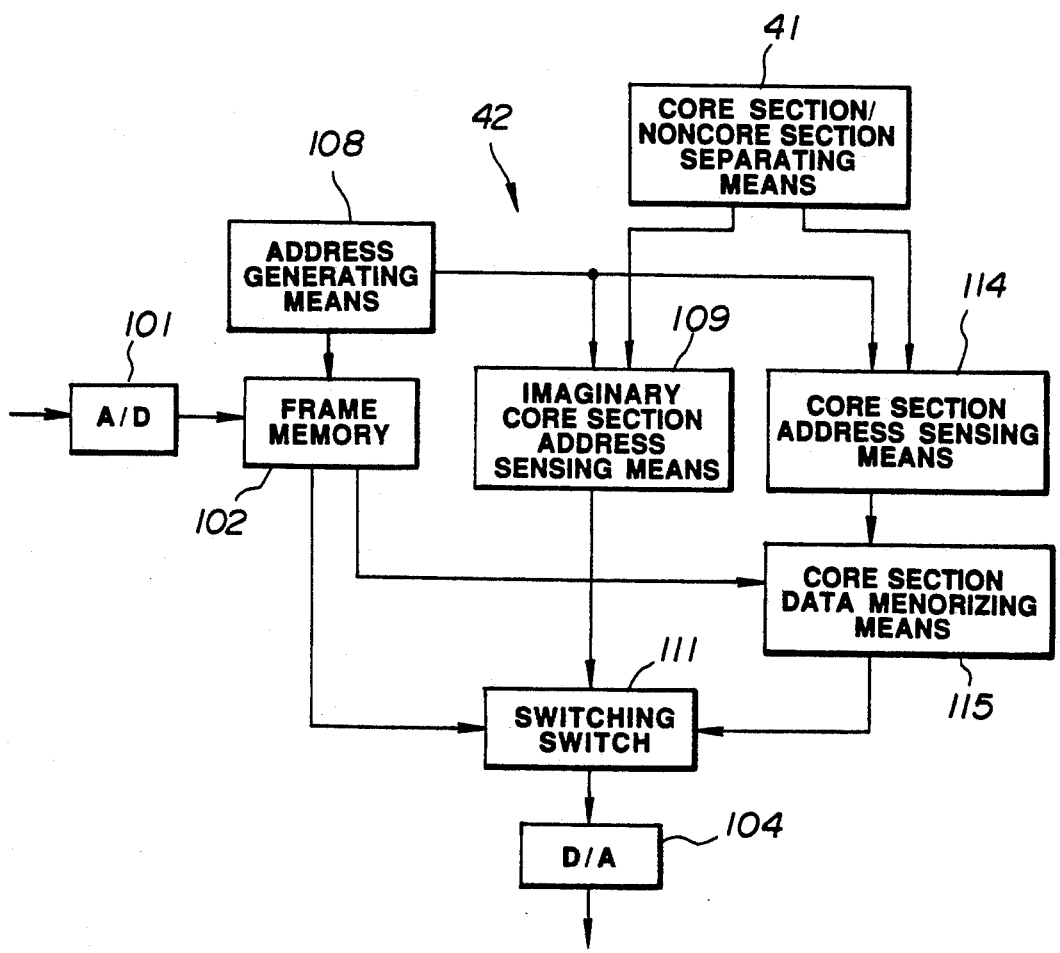

FIG. 29 shows the fourth example.

In this example, the data of the imaginary core section 112 in the above mentioned third example are replaced with the data of the actual core section 51.

The correcting means 42 in this example comprises, the same as in the above mentioned third example, an A/D converter 101 converting the endoscope image from the CCU 13 to a digital image, a frame memory 102 memorizing the output image of this A/D converter 101, an address generating means 108 generating the read-out address of the above mentioned frame memory 102 and an imaginary core section address sensing means 109 sensing the address of the imaginary core section on the basis of the generated addresses of the above mentioned address generating means 108 and the separating data from the core section/noncore section separating means 41.

This correcting means 42 further comprises a core section address sensing means 114 sensing the address of the core section on the basis of the generated addresses of the address generating means 108 and the separating data from the core section/noncore section separating means 41, a core section data memorizing means 115 memorizing the data of the core section in the endoscope image memorized in the frame memory 102 on the basis of the sensed output of this core section address sensing means 114, a switching switch 111 switching and outputting the output of the frame memory 102 and the output of the core section data memorizing means 115 and a D/A converter 104 converting the output of this switching switch 111 to an analog signal to be output to the monitor 16.

In this example, by the core section address sensing means 114, the address of the core section is sensed on the basis of the generated addresses of the address generating means 108 and the separating data from the core section/noncore section separating means 41 and, by the core section data memorizing means 115, the data the above mentioned core section are memorized. On the imaginary core section, by the imaginary core section address sensing means 109, the switching switch 111 is switched and the data of the actual core section near the imaginary core section memorized by the core section data memorizing means 115 are output instead of the data from the frame memory 102. On the other regions than the above mentioned imaginary core section 112, the data from the frame memory 102 are output.

Figure 30:
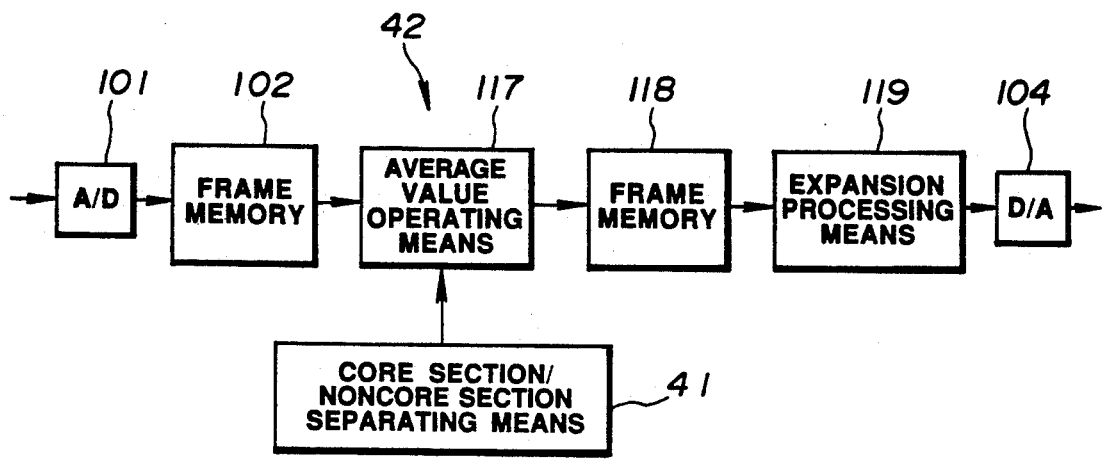
Figure 31:
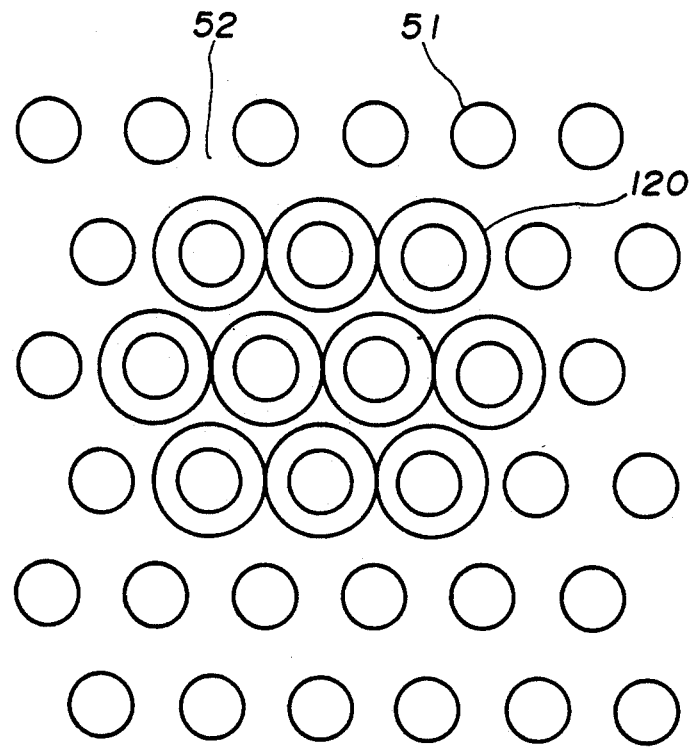

FIGS. 30 and 31 show the fifth example.

In this example, the data within the core section are replaced with the average value of the core section and this core section is processed to be expanded until it contacts the adjacent core section. As shown in FIG. 30. the correcting means 42 in this example comprises an A/D converter 101 converting the endoscope image from the CCU 13 to a digital image, a frame memory 102 memorizing the output image of this A/D converter 101, an average.. value operating means 117 determining the average value of the core section in the endoscope image memorized in the above mentioned frame memory 102 on the basis of the separating data from the core section/noncore section separating means 41, a frame memory 118 memorizing the data within the above mentioned core section as displaced with the average value determined by the above mentioned average value operating means 117, an expanding processing means 119 processing to expand the image memorized in the above mentioned frame memory 118 until the core section contacts the adjacent core section and a D/A converter 104 converting the output of this expanding processing means 119 to an analog signal to be output to the monitor 16.

In this example, by the average value operating means 117, the average value of the core section 51 shown in FIG. 31 is determined and the data within the core section 51 are replaced with the above mentioned average value and, by the expanding processing means 119, the expanding process is made until the expanded core section 120 contacts the adjacent expanded core section 120 so that the data of the region of most of the noncore section 52 will be replaced with the average value of the adjacent core section 51 and the network will be reduced.

Figure 32:
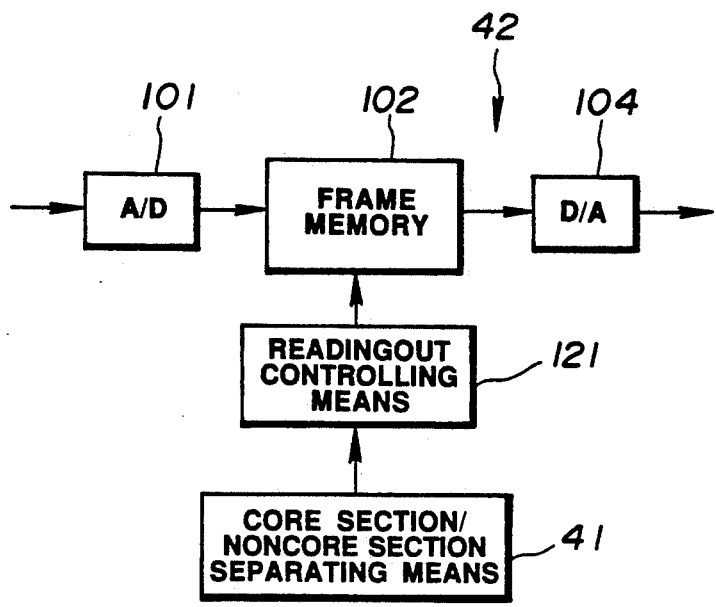
Figure 33:
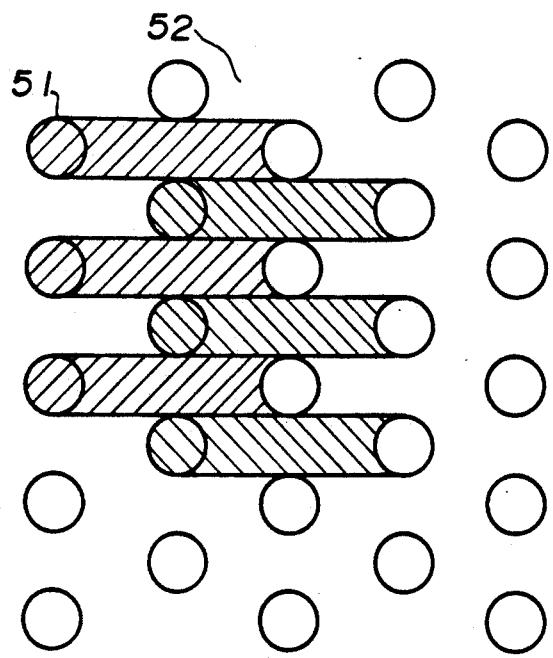

FIGS. 32 and 33 show the sixth example.

In this example, the data of the core section are extended to the adjacent core section in the horizontal direction and the data of the noncore section are replaced with the data of the core section.

As shown in FIG. 32, the correcting means 42 in this example comprises an A/D converter 101 converting the endoscope image from the CCU 13 to a digital image, a frame memory 102 memorizing the output image of this A/D converter 101, a read-out address controlling means 121 controlling the read-out address of the above mentioned frame memory 102 on the basis of the separating data from the core section/noncore section separating means 41 and a D/A converter 104 converting the data read out of the above mentioned frame memory 102 to an analog signal to be output to the monitor 16. In this example, in the case of reading the endoscope image out of the frame memory 102, the read-out address is controlled by the read-out address controlling means 121 and, as shown in FIG. 33, the data of the core section 51 are continuously read out until the adjacent core section 51 in the horizontal direction is reached so that the data of the noncore section 52 will be replaced with the data of the core section 51 and the network will be reduced.

Figure 34:
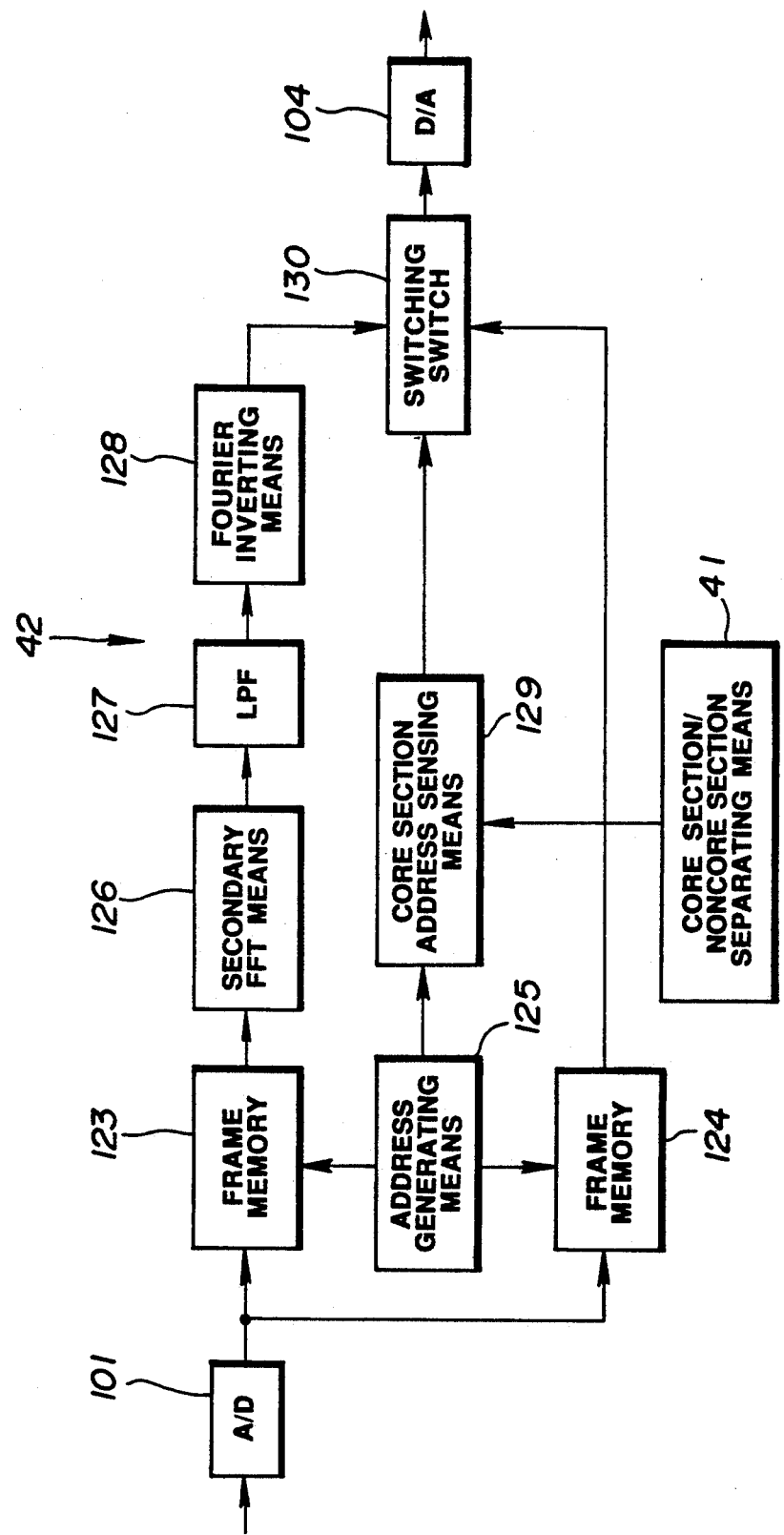

FIG. 34 shows the seventh example.

In this example, a spatial low pass image of the original endoscope image is made and the data of the noncore section of the original endoscope image are replaced with the data of the noncore section of the above mentioned low pass image.

The correcting means 42 in this example comprises an A/D converter 101 converting the endoscope image from the CCU 13 to a digital image, frame memories 123 and 124 memorizing the output image of this A/D converter 101 and an address generating means 125 generating the written-in and read-out addresses of these frame memories 123 and 124. The endoscope image read out of the above mentioned frame memory 123 is Fourier-transformed by the two-dimensional FFT means 126, is passed through a low pass filter (abbreviated as LPF hereinafter) 127 and is returned to the endoscope image by a Fourier reverse transforming means 128. The spatial low pass filter is formed of the above mentioned two-dimensional FFT means 126, LPF 127 and Fourier reverse transforming means 128.

The output of the above mentioned Fourier reverse transforming means 128 and the output of the above mentioned frame memory 124 are switched over to each other by a switch 130 and are output to the monitor 16 through the D/A converter 104. The correcting means 42 is provided with a core section address sensing means 129 sensing the address of the core section on the basis of the generated addresses of the above mentioned address generating means 125 and the separating data from the core section/noncore section separating means 41 so that the above mentioned switching switch 130 will be switched by the output of this core section address sensing means 129.

In this example, by the core section address sensing means 129, the core section address is sensed and the switching switch 130 is switched, on the core section, the original endoscope image read out of the frame memory 124 is output through the switching switch 130 and, on the noncore section, the above mentioned original endoscope image is replaced with the spatial low pass image obtained by the two-dimensional FFT means 126, LPF 127 and Fourier reverse transforming means 128 so that the data of the core section will remain the original data as they are but only the data of the noncore section will be replaced with the low pass image and therefore the network patterns will be able to be reduced without deteriorating the resolution.

Figure 35:
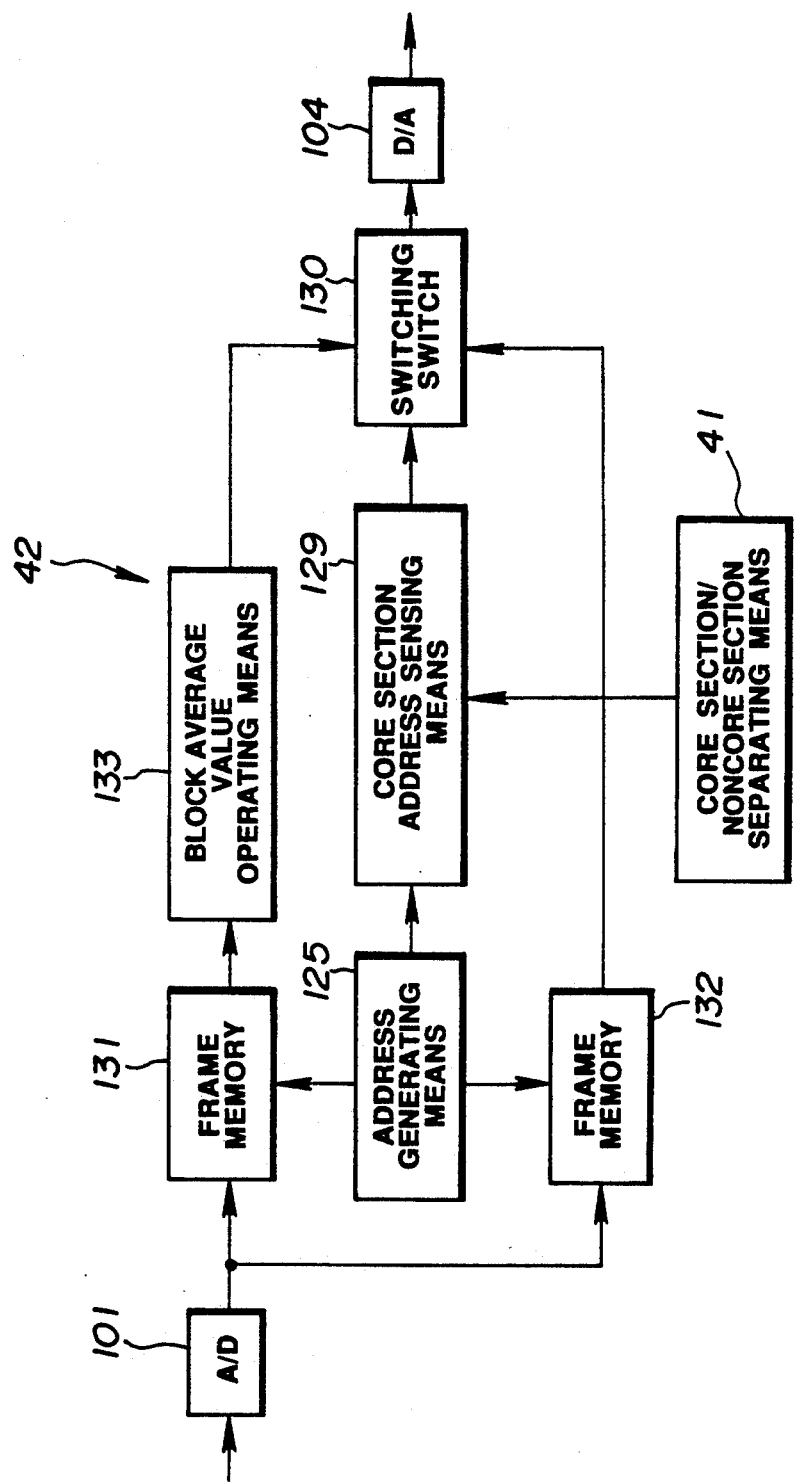

FIG. 35 shows the eighth example.

In this example, the endoscope image is divided into blocks and the data of the noncore sections within each block are replaced with the average value of the block.

The correcting means 42 in this example comprises an A/D converter 101 converting the endoscope image from the CCU 13 to a digital image, frame memories 131 and 132 memorizing the output image of this A/D converter 101 and an address generating means 125 generating the written-in and read-out addresses of these frame memories 131 and 132. This correcting means 42 further comprises a block average value operating means 133 dividing into blocks the endoscope image read out of the above mentioned frame memory 131 and determining the average value of each block, a core section address sensing means 129 sensing the core section address on the basis of the generated address of the above mentioned address generating means 125 and the separating data from the core section/noncore section separating means 41 and a switching switch 130 switched by the output of this core section address sensing means 129 and outputting either of the output of the above mentioned block average value operating means and the output of the above mentioned frame memory 132 and a D/A converter 104 converting the output of this switching switch 130 to an analog signal to be output to the monitor 16.

In this example, by the block average value operating means 133, the average value of each block set within the endoscope image is determined, by the core section address sensing means 129, the address of the core section is sensed and the switching switch 130 is switched, on the core section, the original endoscope image read out of the frame memory 132 is output through the switching switch 130 and, on the noncore section, the above mentioned original endoscope image is replaced with the block average value determined by the above mentioned block average value operating means 133.

Figure 36:
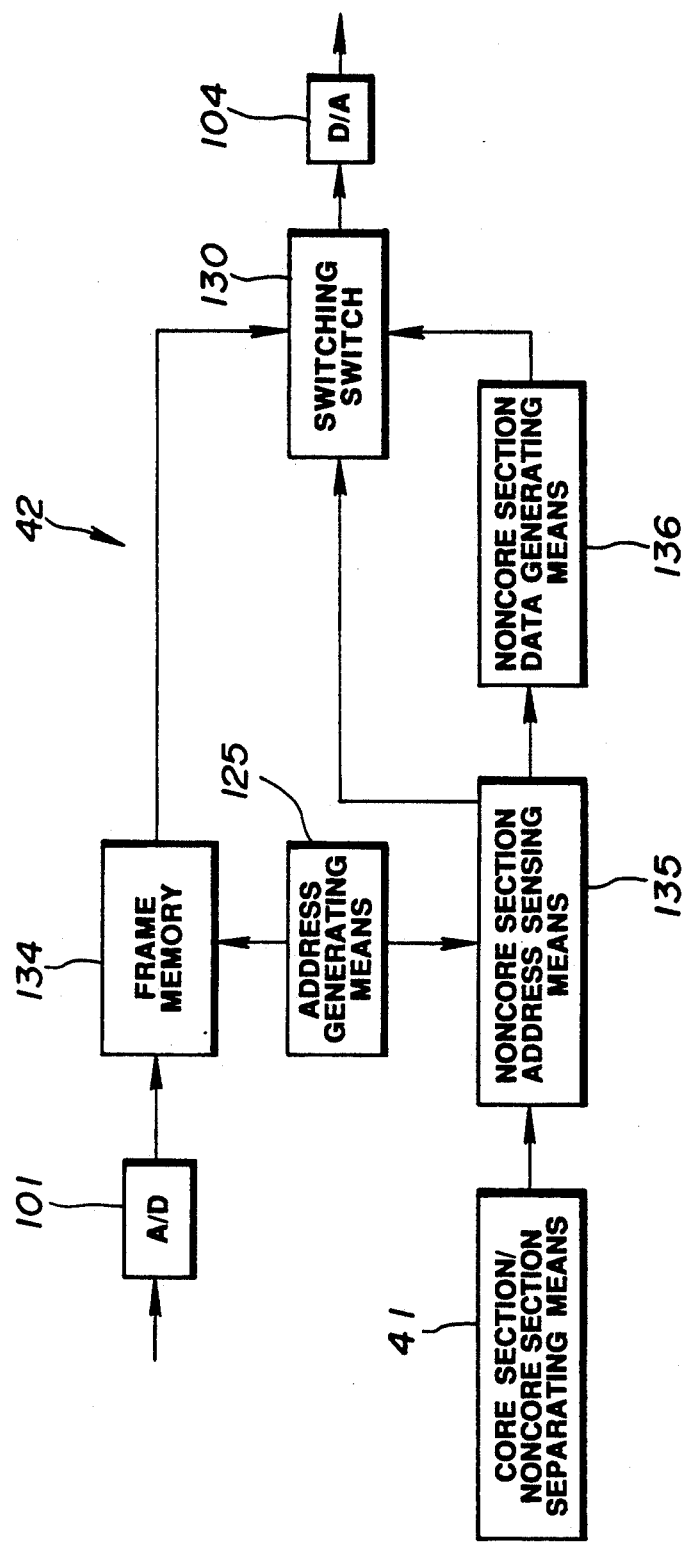

FIG. 36 shows the ninth example.

In this example, the data of all the noncore sections are replaced with fixed data.

The correcting means 42 in this example comprises an A/D converter 101 converting the endoscope image from the CCU 13 to a digital image, a frame memory 134 memorizing the output image of this A/D converter 101, an address generating means 125 generating the written-in and read-out addresses of this frame memory 134 and a noncore section address sensing means 135 sensing the noncore section address on the basis of the generated addresses of this address generating means 125 and the separating data from the core section/noncore section separating means 41.

This correcting means 42 further comprises a noncore section data generating means 136 generating the data of the noncore section in response to the output of the above mentioned noncore section address sensing means 135, a switching switch switched by the output of the above mentioned noncore section address sensing means 135 and outputting either of the output of the above mentioned frame memory 134 and the output of the noncore section data generating means 136 and a D/A converter 104 converting the output of this switching switch to an analog signal to be output to the monitor 16.

In this example, by the noncore section address sensing means 135, the noncore section address is sensed and the switching switch 130 is switched, on the core section, the original endoscope image read out of the frame memory 134 is output through the switching switch 130 and, on the noncore section, the above mentioned original endoscope image is replaced with fixed data from the noncore section data generating means 136. By the way, the above mentioned fixed data are, for example, a gray color or skin color of a medium brightness.

As explained above, according to the network reducing apparatus 15 of this embodiment, the endoscope image transmitted from the CCU 13 is separated into core sections and noncore sections other than the core sections and the image data of at least the above mentioned noncore sections in the above mentioned endoscope image are replaced with other image data so that the network image in the endoscope image will be able to be reduced without deteriorating the picture quality.

Also, according to the first to seventh examples and the tenth example of the core section/noncore section separating means 41, the core section and noncore section can be automatically sensed from the endoscope image and therefore a plurality of kinds of fiber scopes can be easily coped with. As it is not necessary to provide a weighty optical low pass filter, the operating section will not become heavy and the operability will not reduce. Further, the above described many examples can be applied to existing systems having no optical low pass filter to improve the resolution. That is to say, in the existing system, if only the output of the CCU 13 is output to the monitor 16 through the network reducing apparatus 15 of the first embodiment, an image having had the network patterns reduced will be obtained without reducing the resolution.

By the way, the core section/noncore section separating means 41 may separate the endoscope image not only into the core section and noncore section but also into such a representative region within the core section as the center of the core section detected in the seventh example and the other non-representative region than it.

Also, the correcting means 42 may replace not only the data within the noncore section with other data but also the data of the regions other than the above described representative region and of all the regions including this representative region with other data as in the first, second and fourth examples. Also, the correcting means 42 may replace not only all the data within the noncore region with other data but also a part of the data within the noncore section with other data as in the third to fifth examples.

According to the first to third examples and fifth to eighth examples of the core section/noncore section separating means 41, such defective portion of the core section caused by a defect of the optical fibers can be sensed as a noncore section and can be corrected.

Besides the above mentioned methods, such hardware-like network reducing methods as in the following are possible. That is to say, a video signal is passed through an LPF and the lag of the image position thereby is recovered by delaying the timing of the synchronizing signal or the video signal is window-processed or two-dimensional FFT-processed to make the image vague or the displaying position is displaced by a minute distance in each field or frame.

The second embodiment of the present invention shall be explained with reference to FIGS. 37 to 41.

The general formation of the endoscope system in this embodiment is the same as in FIGS. 1 and 2.

Figure 37:
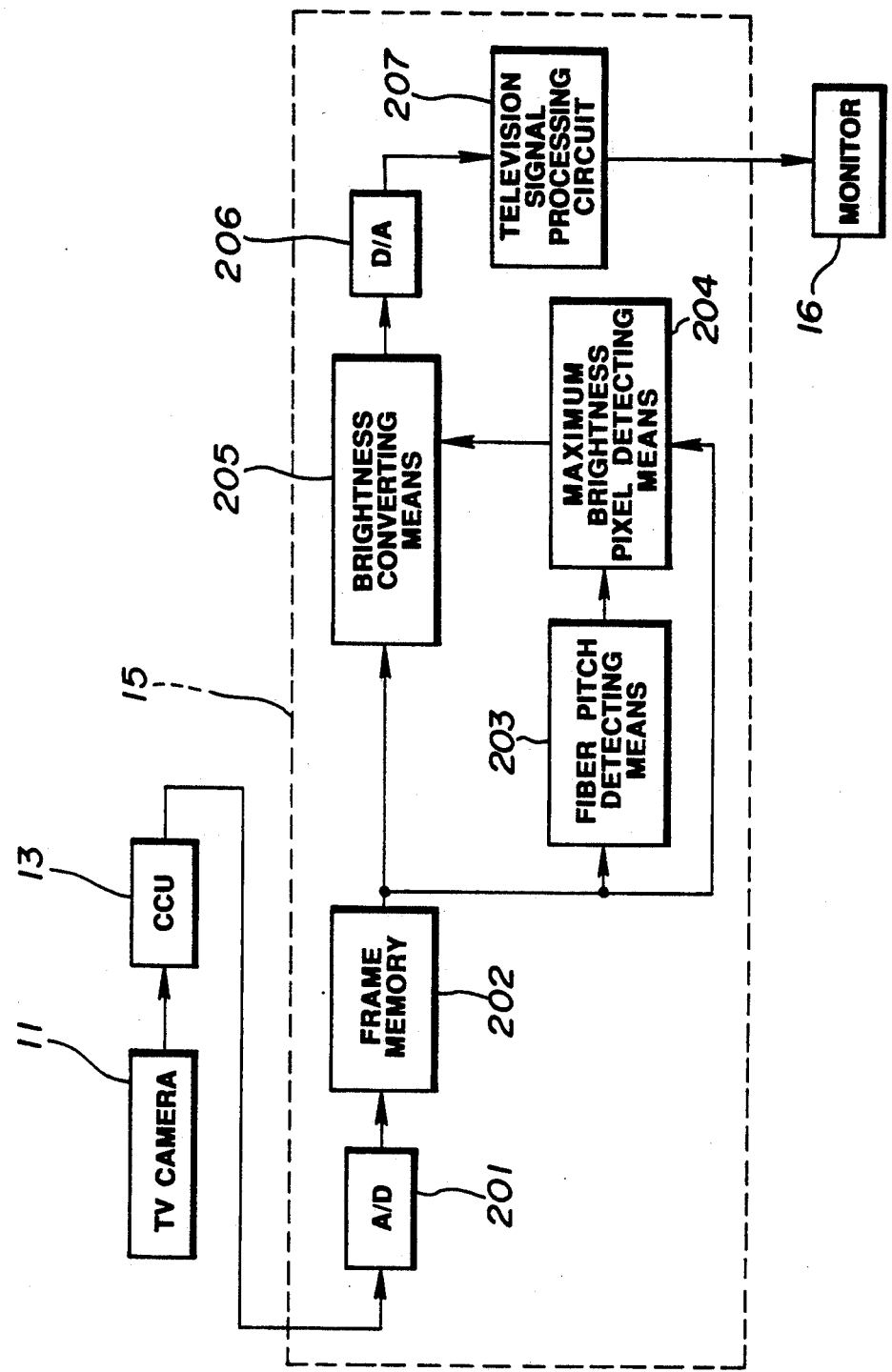
FIGS. 37 to 41 relate to the second embodiment of the present invention.

As shown in FIG. 37, the network reducing apparatus 15 of this embodiment comprises an A/D converter 201 converting the endoscope image from the CCU 13 to a digital image and a frame memory 202 memorizing the output image of this A/D converter 201. Also, the network reducing apparatus 15 comprises a fiber pitch detecting means 203 detecting the fiber pitch of the image guide 24 out of the endoscope image memorized in the above mentioned frame memory 202 as a region separating means and a maximum brightness pixel detecting means 204 detecting a maximum brightness pixel out of a plurality of pixels included within the core section in the endoscope image memorized in the frame memory 202 by using the output of the above mentioned fiber pitch detecting means 203. Also, the network reducing apparatus 15 is provided with a brightness converting means 205 converting the data (brightness) of the pixel of the endoscope image memorized in the frame memory 202 on the basis of the output of the above mentioned maximum brightness pixel detecting means 204. The output data of the above mentioned brightness converting means 205 are converted to an analog signal by the D/A converter 206 and the analog signal is processed by a television signal processing circuit 207 so as to be a video signal to be then output to the monitor 16.

The operation of the above mentioned network reducing apparatus 15 shall be explained in the following with reference to FIGS. 38 to 41.

Figure 38:
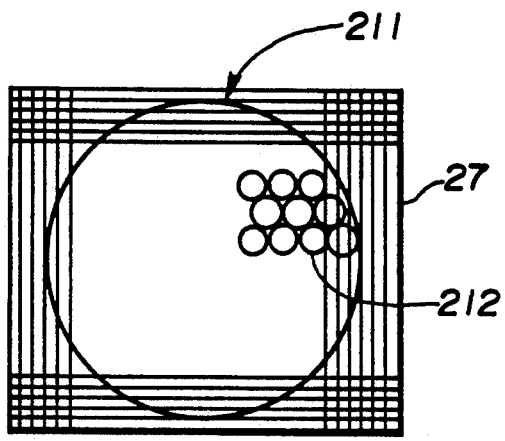
Figure 39:
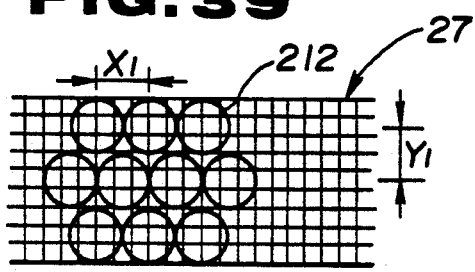
Figure 40:
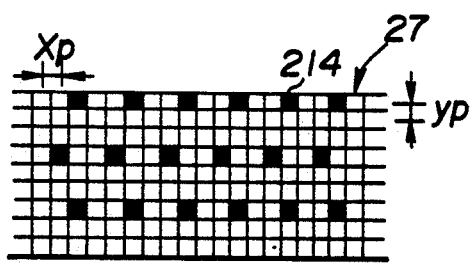
Figure 41:
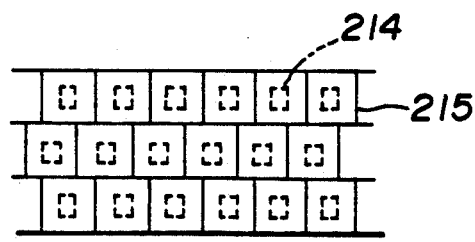

As shown in FIG. 38, an endoscope image 211 transmitted by the image guide 24 of the fiber scope 1 is projected and imaged on the solid state imaging device 27 of the television camera 11. Network patterns by optical fibers 212 forming the above mentioned image guide 24 are included in this endoscope image. The endoscope image output from the CCU 13 is converted to a digital image by the A/D converter 201 within the network reducing apparatus 15 and is memorized in the frame memory 202. The fiber pitch detecting means 203 scans in the X direction and Y direction the endoscope image memorized in the above mentioned frame memory 202 and detects pitches X1 and Y1 respectively in the X and Y directions of the optical fibers 212 on the solid state imaging device 27 as shown in FIG. 39. By the way, the pitches X1 and Y1 can be detected from the specific spatial frequency components of the endoscope image. Also, the maximum brightness pixel detecting means 204 detects the maximum brightness pixel 214 from among a plurality of pixels of the solid state imaging device 27 included within the core sections of the above mentioned optical fibers 212 as shown in FIG. 40 by using the output of the above mentioned fiber pitch detecting means 203. By the way, when the maximum brightness pixels 214 are detected in some core sections, the maximum brightness pixels 214 within the other core sections may be assumed on the basis of the above mentioned pitches X1 and Y1.

By the way, as shown in FIG. 40, the pitches in the X direction and Y direction of the pixels of the solid state imaging device 27 shall be xp and yp. By the brightness converting means 205, for the endoscope image memorized in the frame memory 202, the maximum brightness pixel 214 detected by the above mentioned maximum brightness pixel detecting means 204 is made a center, X1/xp regions 215 are set in the X direction, Y1/yp regions 215 are set in the Y direction and the data (brightness) of the other pixels than the above mentioned pixel 214 within the region 215 are replaced with the data (brightness) of the above mentioned pixel 214 so that the network patterns by the optical fibers 212 will be reduced.

The endoscope image having had the network patterns reduced by the above mentioned brightness converting means 205 is output to the monitor 16 through the D/A converter 206 and television signal processing circuit 207 and is displayed in the monitor 16.

Thus, according to this embodiment, the same as in the first embodiment, the network patterns can be reduced without deteriorating the picture quality. Also, the maximum brightness pixel 214 is detected from within the core section on the solid state imaging device 27, the brightness of the pixel on the peripheral side of this pixel 214 is replaced with the brightness of the above mentioned pixel 214 and therefore the sensitivity is high.

The other formations, operations and effects are the same as in the first embodiment.

Figure 42A:
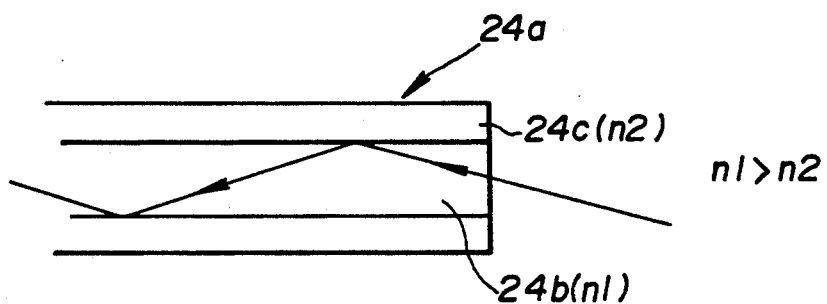
FIG. 42 is an explanatory view showing a fiber structure forming an image guide.

In the above described embodiment, the respective fibers 24b of the fiber bundle forming the image guide 24 have been explained by assuming a light transmitting section formed of a core section 24b large in the refractive index n1 in the central section as shown in FIG. 42a and a cover member consisting of a cylindrical clad section 24c covering this core section 24b on the side and having a refractive index n2 smaller than the above mentioned refractive index n1. However, the present invention is not limited to this but may be of fibers 24d or 24e of the structure shown in FIG. 24c or 42.

Figure 42B:
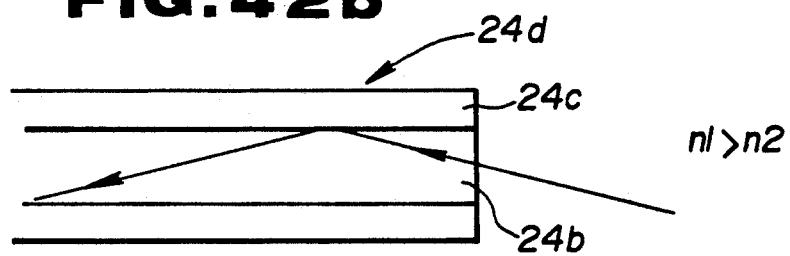

In the fiber 24d shown in FIG. 42b, the refractive index n2 of the clad section 24c is made larger than the refractive index n1 of the core section 24b. In this case, the light incident upon the core section 24b with a large incident angle will not be totally reflected by the boundary surface with the clad section 24c but will be refracted but, outside a large incident angle, such will not happen and, the same as is shown in FIG. 42a, the light will be transmitted while repeating the total reflection on the boundary surface with the clad section 24c.

Figure 42C:
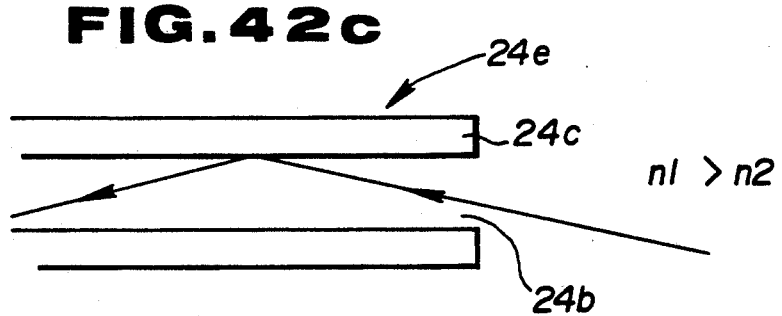

In the fiber 24e shown in FIG. 42c, the core section 24b shown in FIG. 42b is made hollow. In this case, the refractive index n2 of the clad section 24c will be naturally larger than the refractive index n1 (substantially 1) of the core section 24b.

As explained above, according to the present invention the endoscope image is separated into a representative region representing a light transmitting region corresponding to such light transmitting section as the core section of an optical fiber and another non-representative section than this representative region, the image data of the non-representative region are replaced with other image data and therefore there is an effect that the network image by the fiber bundle in the endoscope image transmitted by the image guide made of the fiber bundle can be reduced without deteriorating the picture quality.

What is claimed is:

1. A network pattern reducing apparatus comprising:
an electronic endoscope comprising an elongate insertable section, an illuminating light emitting means emitting an illuminating light from a tip section of said insertable section, an objective optical system provided in the tip section of said insertable section, an image guide inserted through said insertable section, having one end surface arranged in a focal plane of said objective optical system and formed of a fiber bundle transmitting an optical image formed on said one end surface to the other end surface and an imaging means having the optical image transmitted to said other end surface arranged in the image forming position of said other end surface, photoelectrically converting it and producing an image signal corresponding to said optical image and the pattern of said other end surface;

a region separating means separating an image formed of said image signal into a representative region representing a light transmitting region included in said light transmitting section of each fiber forming said fiber bundle and a non-representative region other than this representative region; and a replacing means for replacing the image data of said non-representative region in the image formed by said image signal with other image data, wherein each fiber forming said fiber bundle has said light transmitting section provided with a characteristic of transmitting a light incident upon one end surface to the other end surface and a cover member covering said light transmitting section on the peripheral side surface and formed of a material of a refractive index different form the refractive index of said light transmitting section.

2. A network pattern reducing apparatus according to claim 1 wherein said light transmitting section is formed of a core section of a refractive index larger than of said cover member.

3. A network pattern reducing apparatus comprising:
an electronic endoscope comprising an elongate insertable section, an illuminating light emitting means emitting an illuminating light from a tip section of said insertable section, an objective optical system provided in the tip section of said insertable section, an image guide inserted through said insertable section, having one end surface arranged in a focal plane of said objective optical system and formed of a fiber bundle transmitting an optical image formed on said one end surface to the other end surface and an imaging means having the optical image transmitted to said other end surface arranged in the image forming position of said other end surface, photoelectrically converting it and producing an image signal corresponding to said optical image and the pattern of said other end surface;

a region separating means separating an image formed of said image signal into a representative region representing a light transmitting region included in said light transmitting section of each fiber forming said fiber bundle and a non-representative region other than this representative region; and a replacing means for replacing the image data of said non-representative region in the image formed by said image signal with other image data, wherein said region separating means has a memorizing means for memorizing the arrangement information of said representative regions and said non-representative regions corresponding to said fiber bundle to separate said representative regions and said non-representative regions on the basis of the information read out of said memorizing means, wherein said replacing means replaces the image data of said non-representative region separated by said region separating means with the correcting data memorized in the memorizing means memorizing the correction data.

4. A network pattern reducing apparatus according to claim 3 wherein said replacing means further has an address signal generating means corresponding to said non-representative region to replace the image data with the correcting data read out of said memorizing means by applying said address signal.

5. A network pattern reducing apparatus according to claim 3 wherein said replacing means further has an address signal generating means corresponding to said non-representative region and said memorizing means memorizes the image data separated by said region separating means and replaces the image data of said non-representative region separated by said region separating means with the correcting data read out of said memorizing means by applying said address signal.

6. A network pattern reducing apparatus comprising:
an electronic endoscope comprising an elongate insertable section, an illuminating light emitting means emitting an illuminating light from a tip section of said insertable section, an objective optical system provided in the tip section of said insertable section, an image guide inserted through said insertable section, having one end surface arranged in a focal plane of said objective optical system and formed of a fiber bundle transmitting an optical image formed on said one end surface to the other end surface and an imaging means having the optical image transmitted to said other end surface arranged in the image forming position of said other end surface, photoelectrically converting it and producing an image signal corresponding to said optical image and the pattern of said other end surface;
a region separating means separating an image formed of said image signal into a representative region representing a light transmitting region included in said light transmitting section of each fiber forming said fiber bundle and a non-representative region other than this representative region; and
a replacing means for replacing the image data of said non-representative region in the image formed by said image signal with other image data,
wherein said replacing means has a low pass image producing means forming a spatial low pass image of the image based on said imaging means and replaces the image data of said non-representative region separated by said region separating means with said low pass image.

7. A network pattern reducing apparatus according to claim 6 wherein said low pass image producing means comprises a two-dimensional high speed Fourier-transforming means, a low pass filter means extracting the low pass component of the output signal of said two-dimensional high speed Fourier-transforming means and a reverse Fourier transforming means reverse Fourier-transforming the output signal of said low pass filter means.

8. A network pattern reducing apparatus comprising:
an electronic endoscope comprising an elongate insertable section, an illuminating light emitting means emitting an illuminating light from a tip section of said insertable section, an objective optical system provided in the tip section of said insertable section, an image guide inserted through said insertable section, having one end surface arranged in a focal plane of said objective optical system and formed of a fiber bundle transmitting an optical image formed on said one end surface to the other end surface and an imaging means having the optical image transmitted to said other end surface arranged in the image forming position of said other end surface, photoelectrically converting it and producing an image signal corresponding to said optical image and the pattern of said other end surface;
a region separating means separating an image formed of said image signal into a representative region representing a light transmitting region included in said light transmitting section of each fiber forming said fiber bundle and a non-representative region other than this representative region; and
a replacing means for replacing the image data of said non-representative region in the image formed by said image signal with other image data,
wherein said region separating means has a block making means for dividing the image based on said imaging means into a plurality of blocks and a divaluing means for making the level of the image signal in each block formed by said block making means a divalue signal to separate the image signal in each said block into said representative region and said non-representative region in response to the level of said divalue signal.

9. A network pattern reducing apparatus comprising:
an electronic endoscope comprising an elongate insertable section, an illuminating light emitting means emitting an illuminating light from a tip section of said insertable section, an objective optical system provided in the tip section of said insertable section, an image guide inserted through said insertable section, having one end surface arranged in a focal plane of said objective optical system and formed of a fiber bundle transmitting an optical image formed on said one end surface to the other end surface and an imaging means having the optical image transmitted to said other end surface arrange din the image forming position of said other end surface, photoelectrically converting it and producing an image signal corresponding to said optical image and the pattern of said other end surface;
a region separating means separating an image formed of said image signal into a representative region representing a light transmitting region included in said light transmitting section of each fiber forming said fiber bundle and a non-representative region other than this representative region; and
a replacing means for replacing the image data of said non-representative region in the image formed by said image signal with other image data,
wherein said region separating means is formed of a time fluctuation detecting means for detecting the time fluctuation of the image signal based on said imaging means to separate said image signal into said representative region and said non-representative region by detecting whether the fluctuation is above a fixed level or not.

10. A network pattern reducing apparatus comprising:
an electronic endoscope comprising an elongate insertable section, an illuminating light emitting means emitting an illuminating light form a tip section of said insertable section, an objective optical system provided in the tip section of said insertable section, an image guide inserted through said insertable section, having one end surface arranged in a focal plane of said objective optical system and formed of a fiber bundle transmitting an optical image formed on said one end surface to the other end surface and an imaging means having the optical image transmitted to said other end surface arranged in the image forming position of said other end surface, photoelectrically converting it and producing an image signal corresponding to said optical image and the pattern of said other end surface;

a region separating means separating an image formed of said image signal into a representative region representing a light transmitting region include din said light transmitting section of each fiber forming said fiber bundle and a non-representative region other than this representative region; and a replacing means for replacing the image data of said non-representative region in the image formed by said image signal with other image data, wherein said region separating means has a luminance sensing means for detecting whether the luminance level of the image signal based on said imaging means is above a predetermined level or not.

11. A network pattern reducing apparatus according to claim 10 wherein said region separating means ha a chroma sensing means for detecting whether the chroma level of the image signal based on said imaging means is above a predetermined level or not.

12. A network pattern reducing apparatus comprising:

an electronic endoscope comprising an elongate insertable section, an illuminating light emitting means emitting an illuminating light from a tip section of said insertable section, an objective optical system provided in the tip section of said insertable section, an image guide inserted through said insertable section, having one end surface arranged in a focal plane of said objective optical system and formed of a fiber bundle transmitting an optical image formed on said one end surface to the other end surface and an imaging means having the optical image transmitted to said other end surface arranged in the image forming position of said other end surface, photoelectrically converting it and producing an image signal corresponding to said optical image and the pattern of said other end surface;

a region separating means separating an image formed of said image signal into a representative region representing a light transmitting region included in said light transmitting section of each fiber forming said fiber bundle and a non-representative region other than this representative region; and a replacing means for replacing the image data of said non-representative region in the image formed by said image signal with other image data, wherein said region separating means has a position displacing means for displacing the position of the image based on said imaging means, a correlation detecting means for detecting the correlation between the image displaced in the position and the image not displaced in the position, a peak detecting means for detecting the peak of the correlation and an operating means for calculating the arrangement of said representative regions and said non-representative regions from the position displacement corresponding to the peak time.

13. A network pattern reducing apparatus comprising:

an electronic endoscope comprising an elongate insertable section, an illuminating light emitting means emitting an illuminating light form a tip section of said insertable section, an objective optical system provided in the tip section of said insertable section, an image guide inserted through said insertable section, having one end surface arranged in a focal plane of said objective optical system and formed of a fiber bundle transmitting an optical image formed on said one end surface to the other end surface and an imaging means having the optical image transmitted to said other end surface arranged in the image forming position of said other end surface, photoelectrically converting it and producing an image signal corresponding to said optical image and the pattern of said other end surface;

a region separating means separating an image formed of said image signal into a representative region representing a light transmitting region included in said light transmitting section of each fiber forming said fiber bundle and a non-representative region other than this representative region; and a replacing means for replacing the image data of said non-representative region in the image formed by said image signal with other image data, wherein said region separating means has a size detecting means for detecting an expansion above a predetermined level from the image based on said imaging means and a judging means for judging whether the detected size is above a predetermined size or not.

14. A network pattern reducing apparatus comprising:

an electronic endoscope comprising an elongate insertable section, an illuminating light emitting means emitting an illuminating light from a tip section of said insertable section, an objective optical system provided in the tip section of said insertable section, an image guide inserted through said insertable section, having one end surface arranged in a focal plane of said objective optical system and formed of a fiber bundle transmitting an optical image formed on said one end surface to the other end surface and an imaging means having the optical image transmitted to said other end surface arranged in the image forming position of said other end surface, photoelectrically converting it and producing an image signal corresponding to said optical image and the pattern of said other end surface;

a region separating means separating an image formed of said image signal into a representative region representing a light transmitting region included in said light transmitting section of each fiber forming said fiber bundle and a non-representative region other than this representative region; and a replacing means for replacing the image data of said non-representative region in the image formed by said image signal with other image data, wherein said region separating means has a continuous region detecting means for detecting the time for which the level of each pixel of said imaging means in the image based on said imaging means continues above a predetermined value and judging the image region corresponding to said representative region.

15. A network pattern reducing apparatus according to claim 14 wherein said region separating means has a shrinking means for determining the center of the continuous expansion of the pixel region judged to be above the predetermined value by said continuous region detecting means.

16. A network pattern reducing apparatus comprising:

an electronic endoscope comprising an elongate insertable section, an illuminating light emitting means emitting an illuminating light from a tip section of said insertable section, an objective optical system provided in the tip section of said insertable section, an image guide inserted through said insertable section, having one end surface arranged in a focal plane of said objective optical system and formed of a fiber bundle transmitting an optical image formed on said one end surface to the other end surface and an imaging mans having the optical image transmitted to said other end surface arranged in the image forming position of said other end surface, photoelectrically converting it and producing an image signal corresponding to said optical image and the pattern of said other end surface;

a region separating means separating an image formed of said image signal into a representative region representing a light transmitting region included in said light transmitting section of each fiber forming said fiber bundle and a non-representative region other than this representative region; and a replacing means for replacing the image data of said non-representative region in the image formed by said image signal with other image data, wherein said region separating means has an arrangement memorizing means for memorizing the arrangement of imaginary representative regions and non-representative regions corresponding to said fiber bundle, a correlation detecting means for detecting the correlation between the information read out of said arrangement memorizing means and the image based on said imaging means and a peak detecting means for detecting the peak of the correlation to use the arrangement information of said arrangement memorizing means in case the correlation becomes a peak to separate said representative regions and said non-representative regions.

17. A network pattern reducing apparatus comprising:

an electronic endoscope comprising an elongate insertable section, an illuminating light emitting means emitting an illuminating light from a tip section of said insertable section, an objective optical system provided in the tip section of said insertable section, an image guide inserted through said insertable section, having one end surface arranged in a focal plane of said objective optical system and formed of a fiber bundle transmitting an optical image formed on said one end surface to the other end surface and an imaging means having the optical image transmitted to said other end surface arranged in the image forming position of said other end surface, photoelectrically converting it and producing an image signal corresponding to said optical image and the pattern of said other end surface;

a region separating means separating an image formed of said image signal into a representative region representing a light transmitting region included in said light transmitting section of each fiber forming said fiber bundle and a non-representative region other than this representative region; and a replacing means for replacing the image data of said non-representative region in the image formed by said image signal with other image data, wherein said region separating means has an arrangement information detecting means for detecting the fiber arrangement information of said fiber bundle from the image based on said imaging means to use the arrangement information output from said arrangement information detecting means as the fiber arrangement information of said fiber bundle to separate said representative regions and said non-representative regions.

18. A network pattern reducing apparatus comprising:

an electronic endoscope comprising an elongate insertable section, an illuminating light emitting means emitting an illuminating light from a tip section of said insertable section, an objective optical system provided in the tip section of said insertable section, an image guide inserted through said insertable section, having one end surface and formed of a fiber bundle transmitting an optical image formed on said one end surface to the other end surface and an imaging means having the optical image transmitted to said other end surface arranged in the image forming position of said other end surface, photoelectrically converting it and producing an image signal corresponding to said optical image and the pattern of said other end surface;

a region separating means separating an image formed of said image signal into a representative region representing a light transmitting region included in said light transmitting section of each fiber forming said fiber bundle and a non-representative region other than this representative region; and a replacing means for replacing the image data of said non-representative region in the image formed by said image signal with other image data, wherein said replacing means has an average value detecting means for detecting the average value of the image data of said representative regions separated by said region separating means and an expanding processing means for processing to expand said representative regions until they contact the surrounding representative regions and replacing the image data within the expanded processed regions with said average value.

19. A network pattern reducing apparatus comprising:

an electronic endoscope comprising an elongate insertable section, an illuminating light emitting means emitting an illuminating light from a tip section of said insertable section, an objective optical system provided in the tip section of said insertable section, an image guide inserted through said insertable section, having one end surface arranged in a focal plane of said objective optical system and formed of a fiber bundle transmitting an optical image formed on said one end surface to the other end surface and an imaging means having the optical image transmitted to said other end surface arranged in the image forming position of said other end surface, photoelectrically converting it and producing an image signal corresponding to said optical image and the pattern of said other end surface;

a region separating means separating an image formed of said image signal into a representative region representing a light transmitting region included in said light transmitting section of each fiber forming said fiber bundle and a non-representative region other than this representative region; and a replacing means for replacing the image data of said non-representative region in the image formed by said image signal with other image data, wherein said replacing means divides the image data of said non-representative region separated by said region separating means into the component regions in the direction connecting two adjacent representative regions and replaces the image data of said component regions with the image data of one representative region.

20. A network pattern reducing apparatus comprising:

an electronic endoscope comprising an elongate insertable section, an illuminating light emitting means emitting an illuminating light from a tip section of said insertable section, an objective optical system provided in the tip section of said insertable section, an image guide inserted through said insertable section, having one end surface arranged in a focal plane of said objective optical system and formed of a fiber bundle transmitting an optical image formed on said one end surface to the other end surface and an imaging means having the optical image transmitted to said other end surface arranged in the image forming position of said other end surface, photoelectrically converting it and producing an image signal corresponding to said optical image and the pattern of said other end surface;

a region separating means separating an image formed of said image signal into a representative region representing a light transmitting region included in said light transmitting section of each fiber forming said fiber bundle and a non-representative region other than this representative region; and a replacing means for replacing the image data of said non-representative region in the image formed by said image signal with other image data, wherein said replacing means has a block making means dividing the image based on said imaging means into blocks and an average value detecting means detecting the average value of the images within said blocks and replaces the image data of said non-representative block separated by said region separating means with said average value within the block to which said non-representative region belongs.

21. A network pattern reducing apparatus comprising:

an electronic endoscope comprising an elongate insertable section, an illuminating light emitting means emitting an illuminating light form a tip section of said insertable section, an objective optical system provided in the tip section of said insertable section, an image guide inserted through said insertable section, having one end surface arranged in a focal plane of said objective optical system and formed of a fiber bundle transmitting an optical image formed on said one end surface to the other end surface and an imaging means having the optical image transmitted to said other end surface arranged in the image forming position of said other end surface, photoelectrically converting it and producing an image signal corresponding to said optical image and the pattern of said other end surface;

a region separating means separating an image formed of said image signal into a representative region representing a light transmitting region included in said light transmitting section of each fiber forming said fiber bundle and a non-representative region other than this representative region; and a replacing means for replacing the image data of said non-representative region in the image formed by said image signal with other image data, wherein said replacing means replaces the image data of said non-representative region separated by said region separating means with fixed image data memorized in a memorizing means memorizing the fixed image data.

22. A network pattern reducing apparatus comprising an electronic endoscope comprising an elongate insertable section, an illuminating light emitting means emitting an illuminating light from a tip section of said insertable section, an objective optical system provided in the tip section of said insertable section, an image guide inserted through said insertable section, having one end surface arranged in a focal plane of said objective optical system and formed of a fiber bundle transmitting an optical image formed on said one end surface to the other end surface and an imaging means having the optical image transmitted to said other end surface arranged in the image forming position of said other end surface, photoelectrically converting it and producing an image signal corresponding to said optical image and the pattern of said other end surface;

a region separating means separating an image formed of said image signal into a representative region representing a light transmitting region included in said light transmitting section of each fiber forming said fiber bundle and a non-representative region other than this representative region; and a replacing means for replacing the image data of said non-representative region; in the image formed by said image signal with other image data, wherein said replacing means has a means for detecting a peak pixel at which the luminance in the image based on said imaging means becomes a peak and replaces the image data of said non-representative region separated by said region separating means with the image data of the peak pixel detected by said detecting means.

* * * * *